(12) United States Patent
Pedersen et al.

(10) Patent No.: US 10,318,720 B2
(45) Date of Patent: *Jun. 11, 2019

(54) HEARING DEVICE WITH COMMUNICATION LOGGING AND RELATED METHOD

(71) Applicant: GN Hearing A/S, Ballerup (DK)

(72) Inventors: Brian Dam Pedersen, Ringsted (DK); Allan Munk Vendelbo, Valby (DK)

(73) Assignee: GN Hearing A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,437

(22) Filed: Jul. 14, 2015

(65) Prior Publication Data

US 2017/0006024 A1 Jan. 5, 2017

(30) Foreign Application Priority Data

Jul. 2, 2015 (DK) .................................. 2015 70437
Jul. 2, 2015 (EP) ..................................... 15175141

(51) Int. Cl.
*G06F 21/00* (2013.01)
*G06F 21/33* (2013.01)
*H04L 29/06* (2006.01)
*G06F 21/34* (2013.01)
*G06F 21/44* (2013.01)
*H04R 25/00* (2006.01)

(52) U.S. Cl.
CPC .............. *G06F 21/33* (2013.01); *G06F 21/34* (2013.01); *G06F 21/445* (2013.01); *H04L 63/0428* (2013.01); *H04L 63/0823* (2013.01); *H04R 25/554* (2013.01)

(58) Field of Classification Search
None
See application file for complete search history.

(56) References Cited

U.S. PATENT DOCUMENTS

| | | | |
|---|---|---|---|
| 5,757,920 A | 5/1998 | Misra et al. |
| 5,809,140 A | 9/1998 | Rubin et al. |
| 6,055,575 A | 4/2000 | Paulsen |
| 6,556,686 B1 | 4/2003 | Weidner |
| 6,658,307 B1 | 12/2003 | Mueller |
| 6,724,862 B1 | 4/2004 | Shafferl |

(Continued)

FOREIGN PATENT DOCUMENTS

| | | |
|---|---|---|
| DE | 102 00 796 A1 | 7/2003 |
| DK | 2013 70266 A1 | 11/2014 |

(Continued)

OTHER PUBLICATIONS

Author: Joann Spera, "SSL client authentication: It's a matter of trust", Mar. 2, 1998, 6 pages.*

(Continued)

*Primary Examiner* — Andrew J Steinle
(74) *Attorney, Agent, or Firm* — Vista IP Law Group, LLP

(57) ABSTRACT

A hearing device includes: a processing unit configured to compensate for hearing loss of a user of the hearing device; a memory unit; and an interface; wherein the hearing device is configured to: receive an authentication message from a client device via the interface, derive a client device identifier from the authentication message, and store the client device identifier in the memory unit.

12 Claims, 7 Drawing Sheets

(56) References Cited

U.S. PATENT DOCUMENTS

| | | |
|---|---|---|
| 8,166,312 B2 | 4/2012 | Waldmann et al. |
| 8,670,355 B1 | 3/2014 | Frerking |
| 8,812,851 B2 | 8/2014 | Schwarz |
| 9,219,966 B2 | 12/2015 | Wang |
| 9,402,179 B1 | 7/2016 | Miller |
| 9,608,807 B2 | 3/2017 | Pedersen et al. |
| 9,613,028 B2 | 4/2017 | Foo |
| 9,877,123 B2 | 1/2018 | Pedersen |
| 9,887,848 B2 | 2/2018 | Pedersen |
| 10,158,955 B2 | 12/2018 | Pedersen et al. |
| 2002/0054689 A1 | 5/2002 | Zhang et al. |
| 2002/0169717 A1 | 11/2002 | Challener |
| 2002/0196159 A1 | 12/2002 | Lesenne et al. |
| 2004/0071304 A1 | 4/2004 | Yanz |
| 2004/0117650 A1 | 6/2004 | Karaoguz et al. |
| 2004/0117818 A1 | 6/2004 | Karaoguz et al. |
| 2004/0125958 A1* | 7/2004 | Brewster ............ H04R 5/02 380/270 |
| 2004/0162980 A1 | 8/2004 | Lesenne et al. |
| 2005/0154889 A1 | 7/2005 | Ashley et al. |
| 2006/0005237 A1 | 1/2006 | Kobata et al. |
| 2006/0129848 A1* | 6/2006 | Paksoy ............ G06F 21/78 713/193 |
| 2007/0078866 A1 | 4/2007 | Takashima |
| 2008/0049957 A1 | 2/2008 | Topholm |
| 2009/0210699 A1 | 8/2009 | Grewal et al. |
| 2010/0067711 A1 | 3/2010 | Waldmann |
| 2010/0104122 A1 | 4/2010 | Waldmann |
| 2010/0205447 A1* | 8/2010 | Waldmann ............ H04R 25/70 713/182 |
| 2010/0290627 A1 | 11/2010 | Tsuji et al. |
| 2010/0306525 A1 | 12/2010 | Ferguson |
| 2011/0188684 A1 | 8/2011 | Spieler et al. |
| 2011/0293124 A1 | 12/2011 | Ma |
| 2012/0036364 A1 | 2/2012 | Yoneda et al. |
| 2012/0140962 A1* | 6/2012 | Ubezio ............ H04R 25/558 381/314 |
| 2012/0252411 A1 | 10/2012 | Johnsgard et al. |
| 2012/0252531 A1 | 10/2012 | King |
| 2013/0024798 A1 | 1/2013 | Scheider |
| 2013/0077791 A1 | 3/2013 | Kozuka et al. |
| 2013/0177188 A1 | 7/2013 | Apfel |
| 2013/0177189 A1 | 7/2013 | Bryant |
| 2013/0202138 A1 | 8/2013 | Nishizaki et al. |
| 2013/0251179 A1 | 9/2013 | Aschoff |
| 2013/0257364 A1 | 10/2013 | Redding |
| 2013/0290733 A1 | 10/2013 | Branton et al. |
| 2013/0290734 A1 | 10/2013 | Branton et al. |
| 2013/0329924 A1 | 12/2013 | Fleizach |
| 2014/0004825 A1 | 1/2014 | Prakash |
| 2014/0050341 A1 | 2/2014 | Flynn |
| 2014/0193008 A1 | 7/2014 | Zukic |
| 2014/0211973 A1* | 7/2014 | Wang ............ H04W 4/02 381/315 |
| 2014/0289516 A1 | 9/2014 | Sahay |
| 2014/0331064 A1 | 11/2014 | Ballesteros |
| 2014/0334629 A1 | 11/2014 | Andersen et al. |
| 2014/0341405 A1 | 11/2014 | Pedersen et al. |
| 2015/0023512 A1 | 1/2015 | Shennib |
| 2015/0023534 A1 | 1/2015 | Shennib |
| 2015/0289062 A1 | 10/2015 | Ungstrup |
| 2016/0142838 A1 | 5/2016 | Thomsen |
| 2016/0198271 A1 | 7/2016 | Shennib |
| 2016/0255448 A1 | 9/2016 | Morant |
| 2016/0337769 A1 | 11/2016 | Siddhartha |
| 2017/0006902 A1 | 1/2017 | Pedersen |
| 2017/0099550 A1 | 4/2017 | Blessing |
| 2017/0180419 A1 | 6/2017 | Pedersen et al. |
| 2017/0180886 A1 | 6/2017 | Van Der Loo |
| 2017/0286918 A1 | 10/2017 | Westermann |
| 2017/0318400 A1* | 11/2017 | Westermann ......... H04R 25/558 |
| 2017/0318457 A1 | 11/2017 | Westermann |

FOREIGN PATENT DOCUMENTS

| | | |
|---|---|---|
| EP | 1 582 958 A2 | 10/2005 |
| EP | 2 760 225 A1 | 7/2014 |
| EP | 2 928 212 A1 | 10/2015 |
| EP | 3 021 545 A1 | 5/2016 |
| EP | 3 032 845 A1 | 6/2016 |
| WO | WO 2007/098605 A1 | 9/2007 |
| WO | WO 2007/144435 A2 | 12/2007 |
| WO | WO 2007/144435 A3 | 12/2007 |
| WO | WO 2013/091693 A1 | 6/2013 |
| WO | WO 2014/094866 A1 | 6/2014 |
| WO | WO 2015132419 A2 | 9/2015 |
| WO | WO 2016/078711 | 5/2016 |
| WO | WO 2016/096011 | 6/2016 |

OTHER PUBLICATIONS

First Technical Examination and Search Report dated Feb. 25, 2016 for related Danish Patent Application No. PA 2015 70438.

First Technical Examination and Search Report dated Jan. 25, 2016 for corresponding Danish Patent Application No. PA 2015 70437, 5 pages.

Extended European Search Report dated Jan. 11, 2016 for related EP Patent Application No. 15175142.7, 10 pages.

Gary C. Kessler, "An Overview of Cryptography", Nov. 17, 2006.

Menezes et al., "Handbook of Applied Cryptography, Key Management Techniques", Jan. 1, 1997.

First Technical Examination and Search Report dated Feb. 23, 2016 for related Danish Patent Application No. PA 2015 70435, 5 pages.

Extended European Search Report dated Jan. 12, 2016 for related EP Patent Application No. 15175140.1, 8 pages.

First Technical Examination and Search Report dated Feb. 25, 2016 for related Danish Patent Application No. PA 2015 70436.

First Technical Examination and Search Report dated Feb. 25, 2016 for related Danish Patent Application No. PA 2015 70434.

First Technical Examination and Search Report dated Feb. 22, 2016 for related Danish Patent Application No. PA 2015 70432.

First Technical Examination and Search Report dated Feb. 29, 2016 for related Danish Patent Application No. PA 2015 70433.

Extended European Search Report dated Nov. 20, 2015 for related EP Patent Application No. 15175137.7.

Extended European Search Report dated Dec. 14, 2015 for related EP Patent Application No. 15175135.1.

Joann Spera, "SSL client authentication: It's a matter of trust", Mar. 2, 1998.

Li Wei, "Improvement Method of SSL Protocol Identity Authentication based on the Attribute Certificate", 2012 International Conference on Computer Science and Service System, IEEE Computer Society, Aug. 11, 2012.

Extended European Search Report dated Jan. 4, 2016 for related EP Patent Application No. 151751378.5.

John Padgette, et al., "Guide to Bluetooth Security Recommendations of the National Institute of Standards and Technology", Jun. 2012.

"Link Manager Protocol Specification , 4 Procedure Rules, 4.1 Connection Control, 4.2 Security" In: Bluetooth Specification v4.0, Core System Package,Bluetooth.com, vol. 2, Jun. 30, 2010.

"Message Sequence Charts, 4 Optional Activities After ACL Connection Establishment, 4.2 Simple Pairing Message Sequence Charts" In: Bluetooth Specification v4.0, Core System Package, Bluetooth. com, vol. 2, Jun. 30, 2010.

"Security Specification" In: Bluetooth Specification v4.0, Core System Package, Bluetooth.com, vol. 2, Jun. 30, 2010.

Extended European Search Report dated Dec. 14, 2015 for related EP Patent Application No. 15175141.9.

Vincent Bernat: "Speeding up SSL: enabling session reuse", Sep. 27, 2011.

Extended European Search Report dated Dec. 23, 2015 for related EP Patent Application No. 15175139.3.

Leicher A et al., "Implementation of a Trusted Ticket System", Emerging Challenges for Security, Privacy and Trust. IFIP Advances in Information and Communication Technology, vol. 297, Jan. 1, 2009.

(56) References Cited

OTHER PUBLICATIONS

Notice of Allowance and Fees Due dated Jan. 19, 2017 for related U.S. Appl. No. 14/793,466.
Non-final Office Action dated Feb. 10, 2017 for related U.S. Appl. No. 14/799,463.
Final Office Action dated Mar. 9, 2017 for U.S. Appl. No. 14/793,515.
Final Office Action dated Feb. 17, 2017 for related U.S. Appl. No. 14/799,402.
Non-final Office Action dated Sep. 22, 2016 for related U.S. Appl. No. 14/793,515.
Non-final Office Action dated Sep. 26, 2016 for related U.S. Appl. No. 14/799,402.
Non-final Office action dated Oct. 7, 2016 for related U.S. Appl. No. 14/793,587.
Notice of Allowance and Fee(s) dated Oct. 6, 2017 for related U.S. Appl. No. 14/799,402.
Advisory Action dated Nov. 16, 2017 for related U.S. App. No. 14/793,587.
Notice of Allowance and Fee(s) due dated Nov. 3, 2017 for related U.S. Appl. No. 15/595,526.
Notice of Allowance and Fee(s) due dated Jul. 11, 2017 for related U.S. Appl. No. 14/799,402.
Non-final Office Action dated Jul. 20, 2017 for related U.S. Appl. No. 15/595,526.
Non-final Office Action dated Jul. 21, 2017 for related U.S. Appl. No. 15/623,266.
Non-final Office Action dated Aug. 14, 2017 for related U.S. Appl. No. 14/793,515.
Notice of Allowance and Fee(s) dated Aug. 24, 2017 for related U.S. Appl. No. 14/799,463.
Notice of Allowance and Fee(s) dated Sep. 13, 2017 for related U.S. Appl. No. 14/799,338.
Non-final Office Action dated Sep. 27, 2017 for related U.S. Appl. No. 15/697,406.
Advisory Action dated Jun. 22, 2017 for related U.S. Appl. No. 14/793,515.
Notice of Allowance and Fee(s) due dated Jun. 23, 2017 for related U.S. Appl. No. 14/799,463.
Second Technical Examination and Search Report dated Apr. 5, 2017 for related Danish Patent Application No. PA 2015 70432, 3 pages.
Second Technical Examination dated Jul. 21, 2017 for related Danish Patent Application No. PA 2015 70434, 3 pages.
Communication pursuant to Article 94(3) dated Dec. 8, 2017 for related EP Patent Application No. 15175135.1.
Final Office Action dated Dec. 14, 2017 for related U.S. Appl. No. 15/623,266.
Non-final Office Action dated Jan. 26, 2018 for related U.S. Appl. No. 14/799,463.
Adivsory Action dated Mar. 7, 2018 for related U.S. Appl. No. 15/623,266.
Notice of Allowance dated Mar. 27, 2018 for related U.S. Appl. No. 15/623,266.
Final Office Action dated Apr. 2, 2018 for related U.S. Appl. No. 14/793,515.
Communication pursuant to Article 94(3) dated Jan. 3, 2018 for corresponding EP Patent Application No. 15175141.9.
Non Final Office Action dated Apr. 20, 2018 for related U.S. Appl. No. 15/888,583.
Non Final Office Action dated May 11, 2018 for related U.S. Appl. No. 15/941,816.
Final Office Action dated May 17, 2018 for related U.S. Appl. No. 14/799,463.
Notice of Allowance and Fee(s) for related U.S. Appl. No. 15/941,816.
Final Office Action dated Sep. 19, 2018 for related U.S. Appl. No. 15/697,406.
Final Office Action dated Sep. 21, 2018 for related U.S Appl. No. 15/941,816.
Notice of Allowance and Fee(s) dated Nov. 2, 2018 for related U.S. Appl. No. 15/888,583.
Advisory Action dated Jun. 25, 2018 for related U.S. Appl. No. 14/793,515.
Notice of Allowance and Fee(s) dated Jul. 31, 2018 for related U.S. Appl. No. 14/793,515.
Notice of Allowance and Fee(s) dated Aug. 1, 2018 for related U.S. Appl. No. 14/799,463.
Notice of Allowance and Fees Due dated May 18, 2017 for related U.S. Appl. No. 14/799,338.
Final Office Action dated May 12, 2017 for related U.S. Appl. No. 14/793,587.
Summons to attend to Oral Proceedings dated Jan. 31, 2019 for corresponding EP Application No. 15175141.9.
Torsten Lodderstedt, et al. "OAuth 2.0 Threat Model and Security Considerations IETF" Jan. 31, 2013. pp. 1-71.

* cited by examiner

HEARING DEVICE WITH COMMUNICATION LOGGING AND RELATED METHOD

RELATED APPLICATION DATA

This application claims priority to and the benefit of Danish Patent Application No. PA 2015 70437 filed on Jul. 2, 2015, pending, and European Patent Application No. 15175141.9 filed on Jul. 2, 2015, pending. The entire disclosures of the above applications are expressly incorporated by reference herein.

FIELD

The present disclosure pertains to the field of hearing devices, and in particular to hearing device security. The present disclosure relates to a hearing device with communication logging capability and related method.

BACKGROUND

Functionalities of a hearing device become increasingly advanced. Wireless communications between a hearing device and external devices, such as hearing device fitting apparatus, tablets, smart phones and remote controllers, have evolved. A wireless communication interface of a hearing device uses an open standard-based interface. However, this poses many challenges in terms of security. A hearing device may assume any incoming data as legitimate, and may allow memory to be written or changed by an unauthorized party. Any such attacks may result in a malfunction of the hearing device, or a battery exhaustion attack.

However a hearing device is a very small device with strict constraints in terms of computational power, memory space etc. Off-the-shelf security algorithms and protocols cannot be readily functional on a hearing device.

SUMMARY

There is a need for a hearing device with a capability of monitoring activities and/or actors such as communications and/or communication parties.

Disclosed is a hearing device. The hearing device comprises a processing unit, a memory unit and an interface. The hearing device may comprise a processing unit configured to compensate for hearing loss of a user of the hearing device. The hearing device may be configured to receive an authentication message from a client device via the interface. The hearing device may be configured to derive a client device identifier from the authentication message. The hearing device may be configured to store the client device identifier in the memory unit.

It is an advantage of the present disclosure that the hearing device is capable of logging or recording activities taking place on the hearing device, such as communications and communication parties (e.g. client devices). This enables the hearing device to associate communication parties to keying material and secrets, such that authentication and key derivation can be performed in a faster and simplified manner when a communication party returns to the hearing device. The present disclosure enables an improved, simplified and faster authentication and key derivation for a returning client device while maintaining a same or corresponding level of security.

Also disclosed is a method of operating a hearing device comprising a processing unit configured to compensate for hearing loss of a user of the hearing device, a memory unit, and an interface. The method comprises receiving an authentication message from a client device via the interface; and deriving a client device identifier from the authentication message. The method may comprise storing the client device identifier in the memory unit.

The method and apparatus as disclosed provides a logging capability to the hearing device. This enables the hearing device to log or record one or more client device identifiers that have been in contact with the hearing device. This way, for example, when the same client device connects again to the hearing device, the hearing device can perform a faster and simplifier authentication and key derivation than at the first connection while maintaining the same or corresponding level of security as for the first connection. Further, the present disclosure provides a security architecture that is scalable to a large number of hearing devices, and a large number of client devices.

A hearing device includes: a processing unit configured to compensate for hearing loss of a user of the hearing device; a memory unit; and an interface; wherein the hearing device is configured to: receive an authentication message from a client device via the interface, derive a client device identifier from the authentication message, and store the client device identifier in the memory unit.

Optionally, the authentication message comprises an encrypted client device certificate; and wherein the hearing device is configured to derive the client device identifier from the authentication message by: obtaining a decrypted version of the encrypted client device certificate by decrypting the encrypted client device certificate, and deriving the client device identifier from the decrypted version of the encrypted client device certificate.

Optionally, the authentication message comprises a client device type identifier, and wherein the memory unit is configured to store the client device type identifier.

Optionally, the authentication message comprises a user identifier, and wherein the memory unit is configured to store the user identifier.

Optionally, the processing unit is configured to generate a connection response comprising a session identifier in response to reception of a connection request, and wherein the interface is configured to transmit the connection response.

Optionally, the hearing device is configured to generate a common secret based on a hearing device key.

Optionally, the hearing device is configured to store the session identifier in the memory unit, wherein the session identifier is linked to the client device identifier in the memory unit.

Optionally, the hearing device is configured to authenticate the authentication message using a hearing device certificate stored in the memory unit.

A method of operating a hearing device comprising a processing unit configured to compensate for hearing loss of a user of the hearing device, a memory unit, and an interface, includes: receiving an authentication message from a client device via the interface; deriving a client device identifier from the authentication message; and storing the client device identifier in the memory unit of the hearing device.

Optionally, the authentication message comprises an encrypted client device certificate; and wherein the act of deriving the client device identifier from the authentication message comprises: obtaining a decrypted version of the encrypted client device certificate by decrypting the encrypted client device certificate, and deriving the client device identifier from the decrypted version of client device certificate.

Other features, advantageous, and/or embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
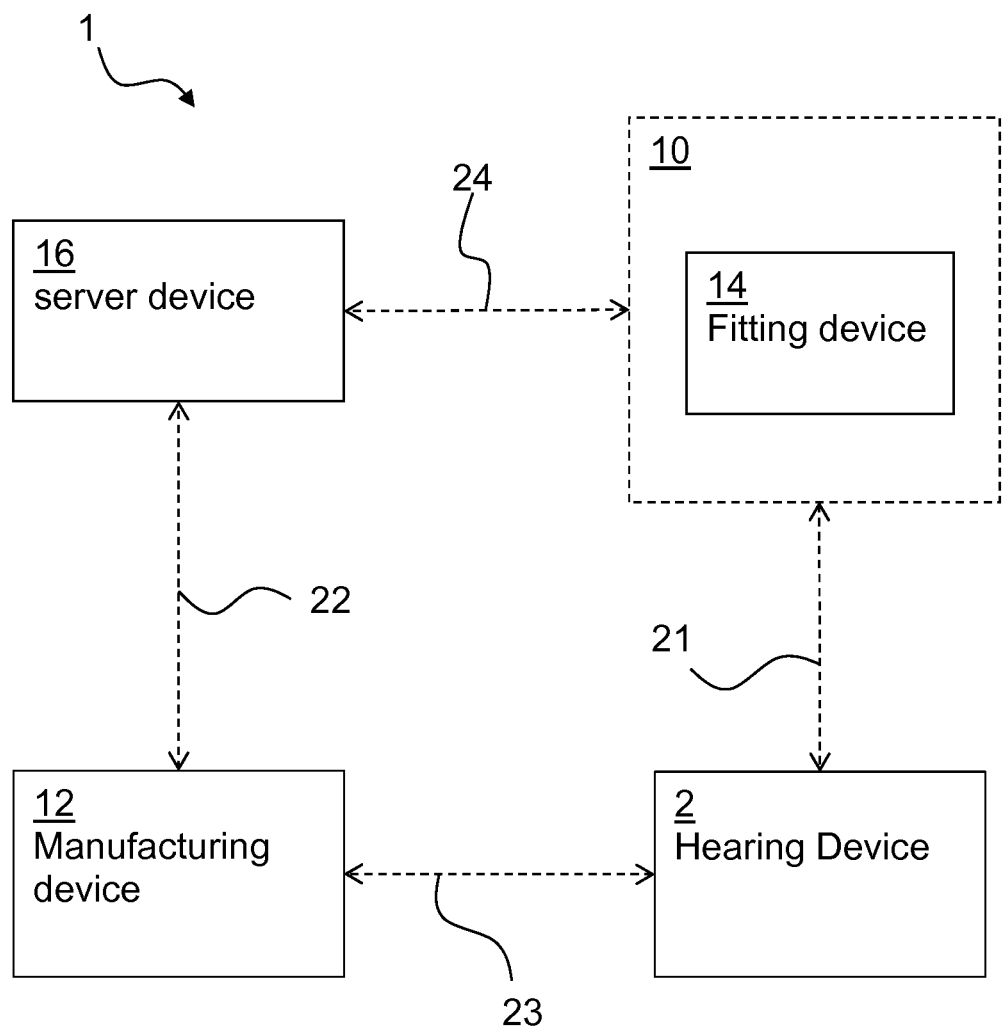
FIG. 1 schematically illustrates an exemplary architecture according to this disclosure, FIG. 2 schematically illustrates an exemplary hearing device, FIG. 3A schematically illustrates an exemplary client device certificate, FIG. 3B schematically illustrates an exemplary hearing device certificate, FIG. 4 schematically illustrates an exemplary signalling diagram between an exemplary hearing device capable of logging according to this disclosure and an exemplary client device, FIG. 5 schematically illustrates a flowchart of an exemplary method, and FIG. 6 schematically illustrates an exemplary signalling diagram.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

It is an object of the present disclosure to provide a hearing device, and a method of manufacturing a hearing device which seeks to mitigate, alleviate, or eliminate one or more of the above-identified deficiencies in the art and disadvantages singly or in any combination.

As used herein, the term "hearing device" refers to a device configured to assist a user in hearing a sound, such as a hearing instrument, a hearing aid device, a headset, a pair of headphones, etc.

As used herein, the term "certificate" refers to a data structure that enables verification of its origin and content, such as verifying the legitimacy and/or authenticity of its origin and content. The certificate is configured to provide a content that is associated to a holder of the certificate by an issuer of the certificate. The certificate optionally comprises keying material, such as an identifier/pointer to one or more cryptographic keys (e.g. a client device key), and/or a digital signature, so that a recipient of the certificate is able to verify or authenticate the certificate content and origin. The certificate permits thus to achieve authentication of origin and content, non-repudiation, and/or integrity protection. The certificate may further comprise a validity period, one or more algorithm parameters, and/or an issuer. A certificate may comprise a digital certificate, a public key certificate, an attribute certificate, and/or an authorization certificate. Examples of certificates are X.509 certificates, and Secure/Multipurpose Internet Mail Extensions, S/MIME, certificates, and/or Transport Layer Security, TLS, certificates.

As used herein, the term "key" refers to a cryptographic key, i.e. a piece of data, (e.g. a string, a parameter) that determines a functional output of a cryptographic algorithm. For example, during encryption, the key allows a transformation of a plaintext into a cipher-text and vice versa during decryption. The key may also be used to verify a digital signature and/or a message authentication code, MAC. A key is so called a symmetric key when the same key is used for both encryption and decryption. In asymmetric cryptography or public key cryptography, a keying material is a key pair, so called a private-public key pair comprising a public key and a private key. In an asymmetric or public key cryptosystem (such as Rivest Shamir Adelman, RSA, cryptosystem), the public key is used for encryption and/or signature verification while the private key is used for decryption and/or signature generation. The hearing device key may be keying material allowing to derive a symmetric session key. The hearing device key may be stored in a memory of the hearing device, e.g. during manufacture. The hearing device key may comprise keying material that is used to derive a symmetric key. The hearing device key comprises for example an Advanced Encryption Standard, AES, key, such as an AES-128 bits key.

As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, unit, with a length of e.g. 8 bits, 16 bits, 32 bits, etc., such as an array of unsigned integers. A key identifier may indicate the key to be used as keying material for securing a communication with an external party, such as with a client device. For example, a hearing device key identifier points to and/or identifies a hearing device key amongst the plurality of the hearing device keys, such as the key to be currently used for deriving e.g. a certificate key and/or a session key for securing a communication.

The present disclosure relates to a hearing device. The hearing device comprises a processing unit, a memory unit and an interface. The hearing device may comprise a processing unit configured to compensate for hearing loss of a user of the hearing device. The interface may comprise a wireless transceiver, e.g. configured for wireless communication at frequencies in the range from 2.4 to 2.5 GHz. In one or more exemplary hearing devices, the interface is configured for communication, such as wireless communication, with a client device and/or a hearing device, respectively comprising a wireless transceiver configured to receive and/or transmit data. The processing unit may be configured to compensate for hearing loss of a user of the hearing device, e.g. according to the received data. The hearing device may be configured to receive an authentication message from a client device via the interface. For example, the interface may be configured to receive the authentication message from the client device. For example the hearing device receives the authentication message from the client device for establishing a communication session. The term "client device" as used herein refers to a device that communicates with the hearing device. The client device may refer to a computing device acting as a client. The client device may comprise a fitting device, a handheld device, a relay, a tablet, a personal computer, a mobile phone, an application running on a personal computer or tablet, or mobile phone and/or USB dongle plugged into a personal computer. The client device may control operation of the hearing device, either by sending fitting data, hearing device operating parameters, and/or firmware data. The hearing device may be configured to derive a client device identifier from the authentication message. The client device identifier refers to an identifier identifying a client device. The client device identifier may for example comprise a medium access control, MAC, address of the client device, and/or a serial number of the client device. The client device identifier allows for example the hearing device to identify the client device amongst a plurality of client devices. The hearing device may be configured to store the client device identifier in the memory unit. The processing unit may store the client device identifier in the memory unit. The memory unit may include removable and non-removable data storage units including, but not limited to, Read Only Memory (ROM), Random Access Memory (RAM), etc. Storing the client device identifier in the memory unit may contribute to the logging capability, i.e. it enables the hearing device to log or record one or more client device identifiers that have been in contact with the hearing device. This may provide an advantage in enabling simplification of key derivation and authentication of a same client device re-connecting with the hearing device at a later stage, such as in a next communication or fitting session.

The authentication message may comprise an encrypted client device certificate. The client device may be assigned a client device certificate. The client device certificate refers to a certificate generated and assigned to the client device by e.g. a device manufacturing the client device. The encrypted client device certificate may be generated by the client device using an encryption algorithm and a certificate key.

The client device certificate may comprise a certificate type identifier. The certificate type identifier may indicate a type of the certificate amongst a variety of certificate types, such as a hearing device family certificate type, a hearing device certificate type, a firmware certificate type, a research and development certificate type, client device certificate type. The certificate type identifier may be used by the hearing device to identify what type of certificate the hearing device receives, stores, and/or retrieves.

The client device certificate may comprise a version identifier which indicates a data format version of the certificate. The hearing device may be configured to use the certificate type identifier and/or the version identifier to determine what type of data the certificate comprises, what type of data is comprised in a field of the certificate. For example, the hearing device may determine based on the certificate type identifier and/or version identifier what field of the certificate comprises a digital signature and/or which public key is needed to verify the digital signature. It may be envisaged that there is a one-to-one mapping between the certificate type identifier and the public-private key pair.

The client device certificate may comprise a signing device identifier. The signing device identifier refers to a unique identifier identifying the device (such as a manufacturing device, e.g. an integrated circuit card, a smart card, a hardware security module) that has signed the client device certificate. The signing device identifier may for example comprise a medium access control, MAC, address of the signing device, a serial number. The signing device identifier allows for example the hearing device to determine whether the signing device is e.g. black listed or not, and thus to reject certificates signed by a signing device that is black listed.

The client device certificate may comprise one or more hardware identifier. The hardware identifier may identify a piece of hardware comprised in the client device, such as a radio chip comprised in the client device, a digital signal processor of the client device. The hardware identifier may be stored in a register of the piece of hardware comprised in the hearing device during manufacturing of the piece of hardware. The hardware identifier may comprise a serial number, a medium access control, MAC, address, a chip identifier, or any combination thereof.

The client device certificate may comprise a client device type identifier. A client device type identifier may be indicative of a type which the client device belongs to. The client device may be attributed a client device type corresponding to a model, category or type of client devices, such as a fitting type, e.g. a tablet product model, category or type configured for fitting the hearing device, a USB dongle product model, category or type configured for fitting the hearing device.

The client device certificate may comprise a client device identifier. The client device certificate may comprise a client device key identifier. A client device key identifier may be indicative of the client device key to be used as keying material for securing a communication with an external party, such as with a hearing device. The client device key identifier may indicate which client device keys are part of the client device certificate. In one or more exemplary client device certificates, the client device certificate comprises a BLUETOOTH address of the client device.

The client device certificate comprises a digital signature. The digital signature enables a proof or verification of authenticity of the hearing device certificate, such as verification of the signer legitimacy. The digital signature is optionally generated by the manufacturing device using a client device fitting private key.

The hearing device may be configured to verify the digital signature when receiving the client device certificate comprising the digital signature (i.e. receiving the authentication message comprising the encrypted client device certificate, and obtaining a decrypted version of the client device certificate). The digital signature is verifiable by the hearing device using a corresponding client device fitting public key. If the digital signature is not successfully verified using the alleged public key, the hearing device may disregard the client device certificate (authentication message) and/or abort normal operation. This may provide the advantage that the hearing device rejects a client device certificate that is tampered or received from unauthenticated parties. The communication with the hearing device may thus be robust against impersonation, modification and masquerading attacks.

To derive the client device identifier from the authentication message may comprise to obtain a decrypted version of the encrypted client device certificate by decrypting the encrypted client device certificate and to derive the client device identifier from the decrypted version of the encrypted client device certificate. The hearing device may be configured to decrypt the encrypted client device certificate using a certificate key, a common secret and/or a hearing device key. The certificate key may be based on a common secret and/or a certificate value. The hearing device may be configured to generate the common secret based on a hearing device key. For example, to generate the common secret based on the hearing device key, the hearing device retrieves the hearing device certificate or parts thereof from the memory unit, the hearing device certificate comprising a hearing device key, which is to be used for deriving the common secret.

The hearing device may be configured to generate the common secret based on a session identifier using the processing unit and to store the common secret in the memory unit. For example, the hearing device may generate a common secret based on a hearing device key and a session identifier. The hearing device may generate the common secret CS, e.g. as follows:

$$CS=hash(HD\_KEY,S\_ID),$$

where hash is a hash function, HD_KEY is the hearing device key and S_ID is a session identifier. The hearing device key may be used as a common secret. The session identifier may be generated by the hearing device upon reception of a connection request. The session identifier may comprise a random or pseudo random number of a defined length. The common secret may be used as a certificate key in one or more exemplary hearing devices.

The certificate key may be generated by performing a hash function on the common secret and/or a certificate value. The hearing device may then generate the certificate key C_KEY e.g. as follows:

$$C\_KEY=hash(CS,C\_VAL),$$

where hash is a hash function, CS is the common secret and C_VAL is a certificate value. The certificate value may be a predefined value or string, such as "certificate".

In one or more exemplary hearing devices, the certificate key may be optionally generated by performing a hash function on the hearing device key and the session identifier. The hearing device may decrypt the encrypted client device certificate using the certificate key generated/obtained by the hearing device and obtain the decrypted version of the client device certificate. The hearing device may then derive the client device identifier from the decrypted version of the client device certificate and may store the client device identifier. The hearing device may verify the content of the decrypted version of the client device certificate.

The authentication message may comprise a client device type identifier, e.g. as a part of an (encrypted) client device certificate. The processing unit may be configured to store the client device type identifier in the memory unit. The client device may be attributed a client device type corresponding to a model, category or type of client devices, such as a fitting type, e.g. a tablet product model, category or type configured for fitting the hearing device, a USB dongle product model, category or type configured for fitting the hearing device. A client device type identifier may refer to an identifier indicative of a client device type. A client device type identifier may uniquely identify a client device type. A client device type identifier may identify a type which the client device belongs to. The client device type identifier may be comprised in the client device certificate. Storing the client device type identifier in the memory unit may contribute to the logging capability, i.e. it enables the hearing device to log or record one or more client device type identifiers that have been authenticated by the hearing device. This may provide an advantage of simplifying authentication of the same client device at a later stage, such as in a next communication or session.

The authentication message may comprise a user identifier, e.g. as a part of an (encrypted) client device certificate. The processing unit may be configured to store the user identifier in the memory unit. A user identifier may refer to an identifier of a user of a client device connecting to a hearing device. A user identifier may uniquely identify a user of a client device, such as an audiologist using a fitting device to connect to the hearing device. A user identifier may be attributed by a client device manufacturer and/or a hearing device manufacturer. A user identifier may link or be associated with a user credentials. A user identifier may be provided as part of the encrypted client device certificate.

The client certificate may comprise a user identifier. Storing the user identifier in the memory unit may contribute to the logging capability, i.e. it enables the hearing device to log or record one or more user identifiers that have been authenticated by the hearing device and obtained successfully access to the hearing device. This may provide an advantage of simplifying key derivation and authentication of the same user and client device at a later stage, such as in a next communication.

The hearing device may be configured to generate by the processing unit a connection response comprising a session identifier in response to reception of a connection request. The hearing device may be configured to transmit the connection response via the interface. The hearing device may be configured to receive a connection request e.g. from a client device. Upon reception of the connection request, the hearing device may be configured to generate a session identifier by generating a random or pseudo-random number. For example, the hearing device may be configured to receive a connection request, generate a session identifier (e.g. a random number), and include the session identifier in a connection response to the client device.

The hearing device may be configured to generate by the processing unit a common secret based on the session identifier, and/or to store the common secret in the memory unit. As shown in connection with the description related to the common secret, the common secret may be generated based on a hearing device key and/or a session identifier. Storing the common secret in the memory unit may contribute to the logging capability, i.e. it enables the hearing device to log or record one or more common secret and thus to derive a certificate key for a client device directly from the common secret stored. This avoids having to re-compute for the same client device the common secret. Further, storing the common secret may enable a token-based authentication. The hearing device may be configured to link the common secret to the client device identifier. To link the common secret to the client device identifier may comprise to associate in a table the common secret to the client device identifier. Linking the common secret to the client device identifier may allow, when the same client device reconnects to the hearing device and provides its client device identifier in clear in the authentication message, the hearing device to retrieve the common secret from the memory and to derive the certificate key directly based the common secret. This may provide some computational efficiency to the hearing device and thus provide power-efficient operation of the hearing device.

The hearing device may be configured to store the session identifier in the memory unit. The session identifier may be linked to the client identifier in the memory unit. Storing the session identifier in the memory unit may contribute to the logging capability, i.e. it enables the hearing device to log or record one or more session identifiers for future communications. The hearing device may be configured to link the session identifier and the client identifier in the memory unit, such as to perform a memory association between the session identifier and the client identifier, such as to associate in a table the common secret to the client device identifier. This may provide an advantage of simplifying authentication of the same user and client device at a later stage, such as in a next communication or session.

The hearing device may be configured to authenticate the authentication message using a hearing device certificate stored in the memory unit. For example, the hearing device may be configured to authenticate the authentication message by verifying the content, origin and/or integrity of the authentication message. The authentication message may comprise an authentication type identifier, and/or an authentication key identifier. An authentication type identifier may be indicative a client device type identifier. An authentication key identifier may be indicative of a hearing device key identifier. For example, the authentication message may comprise an authentication type identifier, and/or an authentication key identifier in plain text. The memory unit may have a hearing device certificate stored thereon. To authenticate the authentication message using the hearing device certificate may comprise to verify the authentication type identifier and/or the authentication key identifier. For example, the hearing device may be configured to verify that the authentication key identifier matches a corresponding hearing device key identifier comprised in the hearing device certificate. For example, the hearing device may be configured to verify that the authentication key identifiers has a value that is equal or higher than a value of the corresponding hearing device key identifier comprised in the hearing device certificate. For example, the hearing device may be configured to verify that the authentication key identifier matches a corresponding client device key identifier comprised in the decrypted version of the client device certificate. For example, the hearing device may be configured to verify that the authentication type identifier matches a corresponding client device type identifier comprised in the decrypted version of the client device certificate.

The hearing device certificate may comprise a hearing device identifier, at least one hearing device key identifier indicative of a hearing device key and one or a plurality of hearing device keys. The hearing device identifier may refer to a unique identifier of the hearing device. The hearing device key identifier may indicate the hearing device key to be used as keying material for securing a communication with an external party, such as with a client device. The hearing device key identifier may indicate which hearing device keys are part of the hearing device certificate. For example, a first hearing device key identifier having the value of "5" indicates that the hearing device certificate includes a first hearing device key with identifier "5", and optionally increments of the identifier, such as hearing device keys with identifiers "6", "7", "8" etc. depending on the number of hearing device keys in the certificate. For example, a hearing device key identifier points to and/or identifies a hearing device key amongst the plurality of the hearing device keys.

The hearing device certificate comprises one or more hearing device keys, such as a plurality of hearing device keys. The plurality of hearing device keys may comprise one or more sets of hearing device keys, such as a first set and/or a second set of hearing device keys. A set of hearing device keys comprises one or more hearing device keys including a primary hearing device key. A set of hearing device keys may comprise a secondary hearing device key, a tertiary hearing device key and/or a quaternary hearing device key. A set of hearing device keys, such as the first set and/or the second set may comprise or consist of a number of different hearing device keys. The number of hearing device keys in a set of hearing device keys may be at least three, such as in the range from three to ten. A set of hearing device keys consisting of three to six hearing device keys may be advantageous given the limited memory size and the desire to provide enough hearing device keys for enabling future operation of the hearing device without requiring a tedious and time-consuming update of the hearing device certificate. A plurality of hearing device keys enables the hearing device to communicate securely with a plurality of client devices using different client device keys. Alternatively or in addition, the hearing device may switch to another hearing device key, e.g. from primary hearing device key to second hearing device key, for example if a client device configured to communicate according to the hearing device key currently used has been compromised. In one or more exemplary hearing devices, the plurality of hearing device keys comprises a first set of hearing device keys including a first primary hearing device key. The at least one hearing device key identifier comprises a first hearing device key identifier indicative of a hearing device key of the first set of hearing device keys. The first set of hearing device keys may comprise a set of hearing device keys, e.g. three or four hearing device keys, dedicated to securing communication to and from a first client device, such as a first client device type. For example, the first set of hearing device key may be a set of hearing device keys for securing communication of hearing device data with a first client device.

The hearing device certificate may comprise one or more client device type authorization identifiers. A client device type may comprise a model, category or type of client devices, such as a tablet product model, category or type, a USB dongle product model, category or type. A client device type authorization identifier is an identifier of an authorized client device type, such as an identifier of the client device types that the hearing device may authorize or accept for communication, such as for fitting. For example, the client device type authorization identifier is in one or more hearing devices a bit-field indicative of the type(s) of client device the hearing device should allow for fitting.

The hearing device certificate may comprise a token parameter. The token parameter may indicate whether a token-based authentication between the hearing device and a client device is to be enabled or not. For example, if the token parameter is set to 0, token-based authentication of client devices is not to be enabled by the hearing device and the hearing device is to use for example a combination of client device type identifier and/or a client device identifier (such as a serial number) to perform an authentication of the client device. If for example the token parameter is set to 1, token-based authentication of client devices is to be enabled by the hearing device, i.e. the hearing device authenticates the client device based on a token received from the client device. The hearing device may also derive a session-specific token based on the received token parameter which is used to e.g. accept the connection to the client device without user intervention.

The present disclosure relates to a method of operating a hearing device comprising a processing unit configured to compensate for hearing loss of a user of the hearing device, a memory unit, and an interface. The method comprises receiving an authentication message from a client device via the interface; and deriving a client device identifier from the authentication message. For example, the interface may be configured to receive the authentication message from the client device. The client device may send the authentication message to the hearing device in order to open a session or a connection with the hearing device, for e.g. sending fitting data, hearing device operating parameters, and/or firmware data. Deriving the client device identifier from the authentication message may comprise obtaining the client device identifier from the authentication message, such as obtaining the client device identifier from processing a payload of the authentication message. The method may comprise storing the client device identifier in the memory unit. Storing the client device identifier in the memory unit may contribute to the logging capability. This enables the hearing device to log or record one or more client device identifiers that have been in contact with the hearing device.

In one or more exemplary methods, the authentication message comprises an encrypted client device certificate. The encrypted client device certificate may be generated by the client device using an encryption algorithm and a certificate key.

In one or more exemplary methods, deriving a client device identifier from the authentication message may comprise obtaining a decrypted version of the encrypted client device certificate by decrypting the encrypted client device certificate and deriving the client device identifier from the decrypted version of client device certificate. Decrypting the encrypted client device certificate may comprise decrypting the encrypted client device certificate using a certificate key. The certificate key may be based on a common secret and/or a certificate value. The method may comprise generating the common secret based on a hearing device identifier and/or a hearing device key. For example, decrypting the encrypted client device certificate may comprise retrieving the hearing device certificate or parts thereof from the memory unit, the hearing device certificate comprising hearing device key. For example, decrypting the encrypted client device certificate may comprise generating the certificate key based on the common secret. For example, generating the common secret may be based on a hearing device key and/or a session identifier. The method may comprise generating the common secret using the processing unit and storing the common secret in the memory unit. The session identifier may be generated by the hearing device upon reception of a connection request. The session identifier may comprise a random or pseudo random number of a defined length. The common secret CS may be generated e.g. as follows:

CS=hash(HD_KEY,S_ID), where hash is a hash function, HD_KEY is the hearing device key and S_ID is the session identifier.

The certificate key may be generated by performing a hash function on the common secret and/or a certificate value. The certificate key C_KEY may be generated e.g. as follows:

C_KEY=hash(CS,C_VAL), where hash is a hash function, CS is the common secret and C_VAL is a certificate value. The certificate value may be a predefined value or string, such as "certificate".

Decrypting the encrypted client device certificate may be based on using the certificate key generated by the hearing device and may result in obtaining the decrypted version of the client device certificate. The hearing device may then derive the client device identifier from the decrypted version of the client device certificate and may store the client device identifier. The hearing device may verify the content of the decrypted version of the client device certificate.

In one or more exemplary methods, the authentication message comprises a client device type identifier, e.g. as a part of an (encrypted) client device certificate. The method may comprise storing the client device type identifier in the memory unit.

In one or more exemplary methods, the authentication message comprises a user identifier, and the method comprises storing the user identifier in the memory unit. Storing the user identifier in the memory provides an advantage in situations where an off-line fitting is necessary or desired.

In one or more exemplary methods, the method comprises generating, e.g. in the hearing device, and transmitting, e.g. via the interface, a connection response comprising a session identifier upon receipt of a connection request. The method may comprise receiving a connection request via the interface, such as via a wireless communication interface, an activation button, a detection of a user input, and/or a docking event etc. The method may comprise generating a session identifier, such as generating a random or pseudo-random number to be used as the session identifier. The method may comprise transmitting a connection response via the interface to e.g. the client device.

The method may comprise generating a common secret based on the session identifier and optionally storing the common secret in the memory unit, the common secret being linked to the client device identifier. Generating a common secret based on the session identifier may comprise generating the common secret based on the session identifier and a hash function, such as based on applying a hash function to the session identifier and a hearing device key. Generating a common secret may comprise retrieving a hearing device key from the memory unit, e.g. based on an authentication type identifier and/or an authentication key identifier of the authentication message. The method may comprise linking the common secret to the client device identifier. For example, linking the common secret to the client device identifier comprises associating the common secret to the client device identifier, such as in a table in the memory unit.

In one or more exemplary methods, the connection response comprises a hearing device identifier of the hearing device, and generating the common secret is based on the hearing device key. For example, generating the common secret comprises retrieving the hearing device key from the memory unit, such as from the hearing device certificate stored in the memory unit.

The method may comprise storing the session identifier in the memory unit, and linking the session identifier to the client device identifier in the memory unit. Linking the session identifier to the client device identifier may comprise associating the session identifier to the client device identifier, such as in a table in the memory unit.

In one or more exemplary methods, the client device identifier is linked or associated with the session identifier and/or the common secret.

In one or more exemplary methods, the method comprises linking the user identifier and/or the client device type identifier to the session identifier and/or the common secret. For example, linking the user identifier and/or the client device type identifier to the session identifier and/or the common secret comprises associating the user identifier and/or the client device type identifier to the session identifier and/or the common secret, such as in one or more tables in the memory unit.

In one or more exemplary methods, the method comprises linking the client device identifier, the user identifier and/or the client device type identifier to the session identifier and/or the common secret. For example, linking the client device identifier, the user identifier and/or the client device type identifier to the session identifier and/or the common secret comprises associating the client device identifier, the user identifier and/or the client device type identifier to the session identifier and/or the common secret, such as in one or more tables in the memory unit.

The method may comprise authenticating the authentication message using a hearing device certificate stored in the memory unit. The authentication message may comprise an authentication type identifier, and/or an authentication key identifier. An authentication type identifier may be indicative a client device type identifier. An authentication key identifier may be indicative of a hearing device key identifier. For example, the authentication message may comprise an authentication type identifier, and/or an authentication key identifier in plain text. The memory unit may have a hearing device certificate stored thereon. Authenticating the authentication message using the hearing device certificate may comprise verifying the authentication type identifier and/or the authentication key identifier. For example, verifying the authentication type identifier and/or the authentication key identifier may comprise verifying that the authentication key identifier is indicative of a hearing device key in the hearing device certificate. For example verifying the authentication type identifier and/or the authentication key identifier may comprise verifying that the authentication key identifier has a value that is equal or higher than a value of the corresponding hearing device key identifier comprised in the hearing device certificate. For example, verifying the authentication type identifier and/or the authentication key identifier comprises verifying that the authentication key identifier matches a corresponding client device key identifier comprised in the decrypted version of the client device certificate. For example, verifying the authentication type identifier and/or the authentication key identifier comprises verifying that the authentication type identifier matches a corresponding client device type identifier comprised in the decrypted version of the client device certificate.

FIG. 1 schematically illustrates exemplary devices that may be used for manufacturing, maintenance, and/or operating a hearing device 2. FIG. 1 shows an exemplary system 1 and a hearing device 2. The system 1 may comprise one or more of a manufacturing device 12, a client device 10, and a server device 16 for manufacturing, maintenance, and/or operating the hearing device 2 in connection with hearing loss compensation (such as for fitting the hearing device, for updating a hearing device parameter).

The manufacturing device 12 may be configured to perform any steps of the method of manufacturing a hearing device. The manufacturing device 12 may be configured to generate a hearing device certificate including the hearing device identifier and at least one of the generated hearing device keys. The manufacturing device 12 may be configured to transmit the hearing device certificate to the hearing device. The manufacturing device 12 may comprise processing elements (such as a processor and a memory).

The hearing device 2 may be configured to compensate for hearing loss of a user of the hearing device 2. The hearing device 2 may be configured to communicate with the manufacturing device 12 using e.g. a communication link 23, such as a uni or bi-directional communication link. The communication link 23 may be a wired link and/or wireless communication link. The communication link 23 may be a single hop communication link or a multi-hop communication link. The wireless communication link may be carried over a short-range communication system, such as BLUETOOTH, BLUETOOTH low energy, IEEE 802.11, Zigbee. The hearing device is configured to receive an authentication message from a client device 10 via the interface 8. For example, the interface 8 is configured to receive the authentication message from the client device 10. For example the hearing device 2 receives the authentication message from the client device 10 for establishing a communication session. The hearing device 2 may be configured to connect to the client device 10 via a communication link 21, such as a bidirectional communication link. The communication link 21 may be a wired link and/or wireless communication link. The communication link 21 may be a single hop communication link or a multi hop communication link. The wireless communication link may be carried over a short-range communication system, such as BLUETOOTH, BLUETOOTH low energy, IEEE 802.11, Zigbee. The hearing device 2 may be configured to connect to the client device 10 over a network. The client device 10 may permit remote fitting of the hearing aid device where a dispenser connects to the hearing device via the client device 10 of the user. The client device 10 may comprise a computing device acting as a client, such as a fitting device 14 (e.g. a handheld device, a relay, a tablet, a personal computer, a mobile phone, and/or USB dongle plugged in a personal computer). The hearing device 2 is configured to derive a client device identifier from the authentication message. The hearing device may be configured to store the client device identifier in the memory unit.

The client device 10 may be configured to communicate with the server device 16 via a communication link 24, such as a bidirectional communication link. The communication link 24 may be a wired link and/or wireless communication link. The communication link 24 may comprise a network, such as the Internet. The client device 10 may be configured to communicate with the server device 16 for maintenance, and update purposes. The server device 16 may comprise a computing device configured to act as a server, i.e. to serve requests from the client device 10 and/or from the hearing device 2. The server device 16 may be controlled by the hearing device manufacturer. The server device 16 may be configured to communicate with the manufacturing device 12 via a communication link 22 for manufacturing maintenance, and/or operational purposes. The server device 16 and the manufacturing device 12 may be co-located and/or form one entity for manufacturing maintenance, and/or operational purposes of the hearing device 2.

Figure 2:
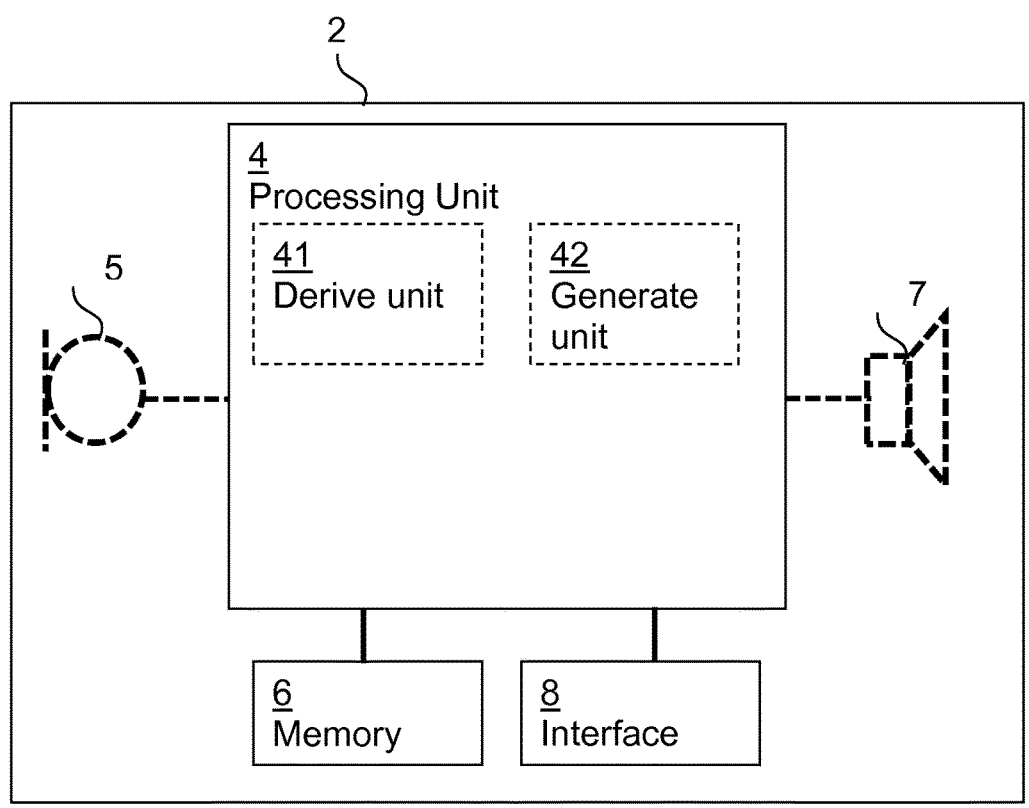

FIG. 2 schematically illustrates an exemplary hearing device 2. The hearing device 2 comprises a processing unit 4, a memory unit 6 and an interface 8. The hearing device 2 comprises a processing unit 4 configured to compensate for hearing loss of a user of the hearing device 2. The interface 8 comprises a wireless transceiver, e.g. configured for wireless communication at frequencies in the range from 2.4 to 2.5 GHz. The interface 8 is configured for communication, such as wired and/or wireless communication, with a manufacturing device 12. The processing unit 4 may be configured to compensate for hearing loss of a user of the hearing aid according to data received during and/or after manufacture of the hearing device. The hearing device 2 comprises a microphone 5 or a plurality of microphones for receiving sound signal(s) and converting sound signal(s) into converted sound signal. The converted sound signal may be an electrical and/or digital version of the sound signal. The processing unit 4 is configured to receive and process the converted sound signal into a processed sound signal according to a hearing loss of a user of the hearing device 2. The processed sound signal may be compressed and/or amplified or the like. The hearing device 2 comprises an output transducer/loudspeaker 7, known as a receiver.

The receiver 7 is configured to receive the processed sound signal and convert it to an output sound signal for reception by an eardrum of the user.

The hearing device is configured to receive an authentication message from a client device 10 via the interface 8. For example, the interface 8 is configured to receive the authentication message from the client device 10. For example the hearing device 2 receives the authentication message from the client device 10 for establishing a communication session. The hearing device 2 is configured to derive a client device identifier from the authentication message. The client device identifier refers to a unique identifier identifying a client device 10. The client device identifier may for example comprise a medium access control, MAC, address of the client device 10, and/or a serial number of the client device 10. The client device identifier allows for example the hearing device 2 to identify the client device 10 amongst a plurality of client devices 10. The processing unit 4 may be configured to derive a client device identifier from the authentication message. Hence the processing unit 4 comprises e.g. a derive unit 41. The hearing device 2 may be configured to store the client device identifier in the memory unit 6. The processing unit 4 may store the client device identifier in the memory unit 6. The memory unit 6 may include removable and non-removable data storage units including, but not limited to, Read Only Memory (ROM), Random Access Memory (RAM), etc. Storing the client device identifier in the memory unit 6 may provide an advantage in enabling simplification of key derivation and authentication of a same client device reconnecting with the hearing device at a later stage, such as in a next communication or fitting session.

The hearing device 2 may be configured to receive a hearing device certificate 100, e.g. via the interface 8. The hearing device 2 may be configured to store the hearing device certificate, e.g. in the memory unit 6. The hearing device 2 may also grant access to the manufacturing device 12 which then stores or writes the hearing device certificate in the memory unit 6. The memory unit 6 may include removable and non-removable data storage units including, but not limited to, Read Only Memory (ROM), Random Access Memory (RAM), etc. The memory unit 6 may have the hearing device certificate stored thereon. The hearing device certificate may comprise a hearing device identifier, at least one hearing device key identifier indicative of a hearing device key and a plurality of hearing device keys. The memory unit 6 may have the hearing device certificate 100 stored at a memory address of the memory unit 6. The memory unit 6 may have stored e.g. the hearing device identifier, the at least one hearing device key identifier, the plurality of hearing device keys, and/or any data comprised in the hearing device certificate at distinct respective memory addresses of the memory unit 6. The hearing device 2 may be configured to retrieve the hearing device identifier, the at least one hearing device key identifier, the plurality of hearing device keys, and/or any data comprised in the hearing device certificate from the distinct respective memory addresses of the memory unit 6. The hearing device 2 may use the hearing device certificate or at least part(s) thereof to secure communication with external entities, such as the client device, the server device, another hearing device.

The authentication message may comprise an encrypted client device certificate. The authentication message comprises a client device identifier, e.g. as part of the encrypted client device certificate. The interface 8 receives the authentication message which may comprise an encrypted client device certificate. In one or more exemplary hearing devices, to derive the client device identifier from the authentication message, the hearing device 2 or the processing unit 6 obtains a decrypted version of the encrypted client device certificate by decrypting the encrypted client device certificate and derives the client device identifier from the decrypted version of the encrypted client device certificate. For example, the processing unit 6 decrypts the encrypted client device certificate using a certificate key. The certificate key may be based on a common secret and/or a certificate value. For example, to generate the common secret based on the hearing device key, the processing unit 6 retrieves the hearing device certificate from the memory unit 6, the hearing device certificate comprising a hearing device key.

Upon reception of a connection request, the processing unit 6 computes a session identifier as a random or pseudorandom number. The processing unit 6 stores the session identifier in the memory unit 6. The processing unit 6 generates the common secret based on the session identifier and stores the common secret in the memory unit. The processing unit 4 may be configured to generate a session identifier, a common secret, a hearing device key, and a certificate key. Hence the processing unit 4 comprises e.g. a generate unit 42. For example, the processing unit 6 generates the common secret based on the hearing device key and the session identifier. The processing unit 6 may generate the common secret CS, e.g. as follows:

$$CS=hash(HD\_KEY,S\_ID),$$

where hash is a hash function, HD_KEY is the hearing device key and S_ID is the session identifier.

The processing unit 6 may generate the certificate key by performing a hash function on the common secret and/or a certificate value. The processing unit 6 may generate the certificate key C_KEY e.g. as follows:

$$C\_KEY=hash(CS,C\_VAL),$$

where hash is a hash function, CS is the common secret and C_VAL is a certificate value. The certificate value may be a predefined value or string, such as "certificate".

The processing unit 6 decrypts the encrypted client device certificate using the certificate key generated and obtains the decrypted version of the client device certificate. The processing unit 6 then derives the client device identifier from the decrypted version of the client device certificate and stores the client device identifier. The hearing device may verify the content of the decrypted version of the client device certificate.

In one or more exemplary hearing devices, the authentication message comprises a client device type identifier, e.g. as a part of an (encrypted) client device certificate. The processing unit 6 is configured to store the client device type identifier in the memory unit 6. For example, the decrypted version of the client device certificate comprises the client device type identifier. In an exemplary hearing device and/or method, the authentication message comprises the client device type identifier in plain text.

The authentication message may comprise a user identifier, and the processing unit 6 may be configured to store the user identifier in the memory unit 6. For example, the hearing device 2 receives the user identifier as plaint text in the authentication message or as part of the encrypted client device certificate comprised in the authentication message.

The hearing device 2 may be configured to generate by the processing unit 4 a connection response comprising a session identifier in response to reception of a connection request. The hearing device 2 may be configured to transmit via the interface 8 the connection response. For example, the hearing device 2 receives a connection request via the interface 8, generates a random number as a session identifier using the processing unit 4, includes the session identifier in a connection response and transmits the connection response to the client device 10. For example, the interface 8 is configured to receive a connection request e.g. from a client device 10. Upon reception of the connection request at the interface 8, the interface 8 informs the processing unit 4 which generates a session identifier as a random or pseudo-random number, and includes the session identifier in a connection response. The interface 8 transmits the connection response.

In one or more exemplary hearing devices, the hearing device 2 is configured to link the common secret to the client device identifier. For example, the hearing device 2 is configured to link the common secret to the client device identifier by associating in a list or table the common secret to the client device identifier. Linking the common secret to the client device identifier may allow, when the same client device 10 connects again to the hearing device 2 and provides its client device identifier in clear in the authentication message, the hearing device 2 to retrieve the common secret from the memory 6 and to derive the certificate key directly based the common secret. This may provide some computational and power efficiency to the hearing device 2.

In one or more exemplary hearing devices, the hearing device 2 is configured to store the session identifier in the memory unit 6. The hearing device 2 may be configured to link the session identifier to the client identifier in the memory unit 6, such as in a list or table, to associate the session identifier and the client identifier in the memory unit 6. For example, the processing unit 4 is configured to link the session identifier and the client identifier in the memory unit, such as to perform a memory association between the session identifier and the client identifier, such as to associate in a table the common secret to the client device identifier. This may provide an advantage of simplifying authentication of the same user and client device 10 at a later stage, such as in a next communication or session.

Figure 3A:
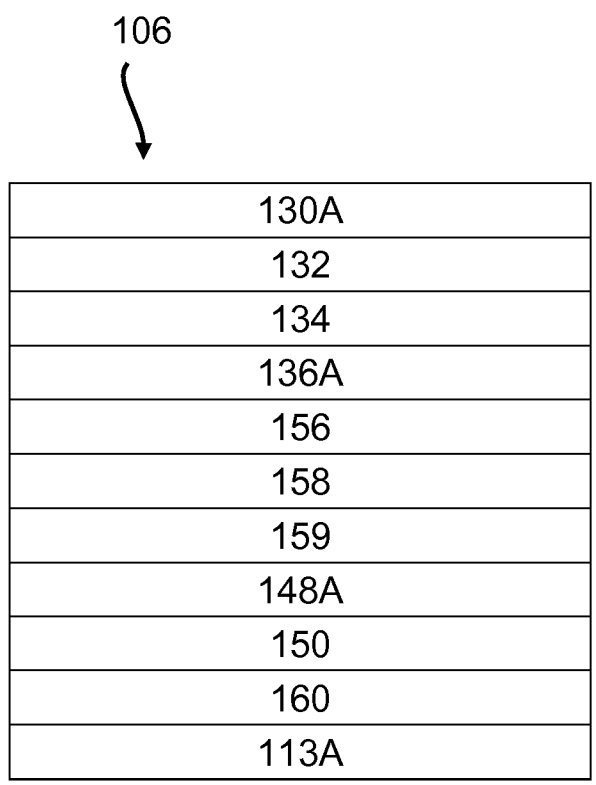

FIG. 3A schematically illustrates an exemplary client device certificate 106. The authentication message may comprise the client device certificate 106 or an encrypted client device certificate 106A. The client device 10 may be assigned a client device certificate 106. The client device certificate 106 refers to a certificate generated and assigned to the client device by e.g. a device manufacturing the client device 10. The encrypted client device certificate 106A may be generated by the client device 10 using an encryption algorithm and a certificate key. The client device certificate 106 may comprise a certificate type identifier 130A. The certificate type identifier 130A may indicate a type of the certificate amongst a variety of certificate types, such as a hearing device family certificate type, a hearing device certificate type, a firmware certificate type, a research and development certificate type, client device certificate type. The certificate type identifier 130A may be used by the hearing device 2 to identify what type of certificate it receives, stores, and/or retrieves. The client device certificate 106 may comprise a version identifier 132 which indicates a data format version of the client device certificate 106. The hearing device 2 may be configured to use the certificate type identifier 130A and/or the version identifier 132 to determine what type of data the certificate comprises and/or what type of data is comprised in a field of the certificate. For example, the hearing device 2 determines based on the certificate type identifier 130A and/or version identifier 132 what field of the certificate 106 comprises a digital signature 113A and/or which public key is needed to verify the digital signature 113A. It may be envisaged that there is a one-to-one mapping between the certificate type identifier 130A and the public-private key pair. The client device certificate 106 may comprise one or more of a signing device identifier 136A. The signing device identifier 136A refers to a unique identifier identifying the device (such as a manufacturing device, e.g. an integrated circuit card, a smart card, a hardware security module) that has signed the client device certificate 106. The signing device identifier 136A may for example comprise a medium access control, MAC, address of the signing device, a serial number. The signing device identifier 136A allows for example the hearing device 2 to determine whether the signing device is e.g. black listed or not, and thus to reject certificates signed by a signing device that is black listed. The client device certificate 106 may comprise one or more hardware identifiers, such as a first hardware identifier 148A and a second hardware identifier 150. The hardware identifiers 148A, 150 may identify a piece of hardware comprised in the client device 10, such as a radio chip comprised in the client device and/or a digital signal processor of the client device. The hardware identifier(s) may be stored in a register of the piece of hardware comprised in the hearing device during manufacturing of the piece of hardware. The hardware identifier(s) may comprise a serial number, a medium access control, MAC, address, a chip identifier, or any combination thereof.

In one or more exemplary client device certificates, the client device certificate 106 comprises a client device type identifier 156. A client device type identifier 156 may be indicative of a type which the client device belongs to. The client device certificate 106 may comprise a client device identifier 158. The client device certificate may comprise a client device key identifier 159. A client device key identifier 159 may be indicative of the client device key to be used as keying material for securing a communication with an external party. The client device key identifier 159 may indicate which client device keys are part of the client device certificate 106.

In one or more exemplary client device certificates, the client device certificate 106 comprises a BLUETOOTH address 160 of the client device.

The client device certificate 106 comprises a digital signature 113A. The digital signature 113A enables a proof or verification of authenticity of the client device certificate, such as verification of the signer legitimacy. The digital signature 113A is optionally generated by the manufacturing device 12 using a client device fitting private key. The hearing device 2 may be configured to verify the digital signature 113A when receiving the client device certificate comprising the digital signature 113A (i.e. receiving the authentication message comprising the encrypted client device certificate, and obtaining a decrypted version of the client device certificate 106B). The digital signature 113A is verifiable by the hearing device 2 using a corresponding client device fitting public key. If the digital signature 113A is not successfully verified using the alleged public key, the hearing device 2 may disregard the client device certificate 106 (authentication message) and/or abort normal operation. This may provide the advantage that the hearing device 2 rejects a client device certificate 106/authentication message that is tampered or received from unauthenticated parties. The communication with the hearing device 2 may thus be robust against impersonation, modification and masquerading attacks.

Figure 3B:
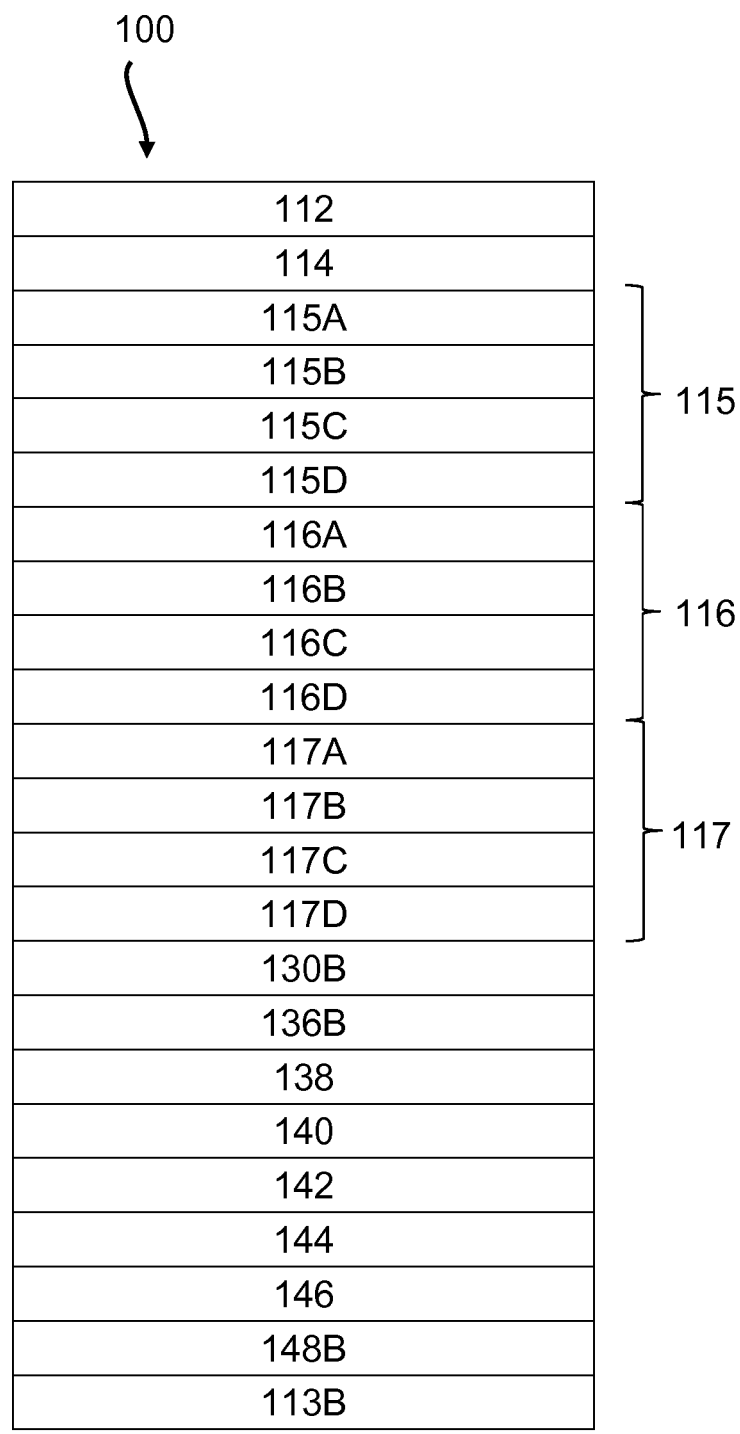

FIG. 3B schematically illustrates an exemplary hearing device certificate 100. The hearing device certificate 100 comprises a hearing device identifier 112, at least one hearing device key identifier including a first hearing device key identifier 114 indicative of a hearing device key and one or a plurality of hearing device keys. The hearing device identifier 112 may refer to a unique or a pseudo-unique identifier. The first hearing device key identifier 114 is indicative of the first hearing device key(s) of the hearing device certificate. For example, the first hearing device key identifier 114 may be indicative of or point to a hearing device key of a first set 115 of hearing device keys (115A, 115B, 115C, 115D) of the hearing device certificate, e.g. the first primary hearing device key 115A.

The hearing device certificate 100 optionally comprises two, three or at least four sets of hearing device keys enabling secure and distinct communication with corresponding number of different client devices/client device types.

The hearing device certificate 100 comprises a first set 115 of hearing device keys including a first primary hearing device key 115A. The at least one hearing device key identifier comprises a first hearing device key identifier 114 indicative of a hearing device key of the first set 115 of hearing device keys 115A, 115B, 115C, 115D. The first set 115 of hearing device keys comprises for example first primary key 115A, first secondary key 115B, first tertiary key 115C, and first quaternary key 115D dedicated to securing communication to and from a first client device or a first client device type. For example, the first set 115 of hearing devices key may be a set of hearing device keys 115A, 115B, 115C, 115D for securing communication of hearing device data with the first client device.

The plurality of hearing device keys may comprise a second set 117 of hearing device keys including a second primary hearing device key 117A, a second secondary hearing device key 117B, a second tertiary hearing device key 117C, and/or a second quaternary hearing device key 117D. The at least one hearing device key identifier comprises a second hearing device key identifier 116 indicative of a hearing device key of the second set 117 of hearing device keys 117A, 117B, 117C, 117D. The hearing device is configured to communicate with one or more client devices, such as a first client device and/or a second client device. For each client device or client device type that the hearing device is configured to communicate with, the hearing device certificate comprises a set of hearing device keys configured to enable secure communication with a specific client device or client device type, and a hearing device key identifier indicating which hearing device keys that are part of the hearing device certificate. The hearing device certificate may comprise a third set 119 of hearing device keys including a third primary hearing device key 119A, a third secondary hearing device key 119B, a third tertiary hearing device key 119C, and/or a third quaternary hearing device key 119D. The at least one hearing device key identifier comprises a third hearing device key identifier 118 indicative of a hearing device key of the third set 119 of hearing device keys. The hearing device certificate 100 may comprise a fourth set of hearing device keys including a fourth primary hearing device key (not shown). The at least one hearing device key identifier comprises a fourth hearing device key identifier indicative of a hearing device key of the fourth set of hearing device keys. The hearing device 2 may be configured to select a set of hearing device keys based on the client device or the client device type connected to the hearing device and to select a hearing device key from the set of hearing device keys selected based on the hearing device key identifier associated with the selected set of hearing devices.

The hearing device certificate 100 comprises a certificate type identifier 130B. The certificate type identifier 130B indicates that the hearing device certificate 100 is a hearing device certificate, e.g. selected amongst a variety of certificate types, such as a hearing device family certificate type, a hearing device certificate type, a firmware certificate type, a research and development certificate type, and a client device certificate type. The certificate type identifier 130B may be used to enable the hearing device 2 to identify what type of certificate it receives, stores, authenticates and/or retrieves. The hearing device certificate 100 may comprise a version identifier which indicates a data format version of the hearing device certificate. The hearing device 2 may use the certificate type identifier 130B and/or the version identifier to determine what type of data the hearing device certificate 100 comprises, what type of data is comprised in a field of the hearing device certificate 100. For example, the hearing device 2 may determine based on the certificate type identifier 130B and/or version identifier what field of the certificate comprises a digital signature 113A, and which public key is needed to verify the digital signature 113A. It may be envisaged that there is a one-to-one mapping between the certificate type identifier 130B and the public-private key pair used for generating the digital signature 113A. The hearing device certificate 100 may comprise a length identifier that indicates the length of the hearing device certificate 100, e.g. in bits, bytes.

The hearing device certificate 100 optionally comprises a signing device identifier 136B. The signing device identifier 136B refers to a unique identifier identifying the device (such as a manufacturing device 12, e.g. an integrated circuit card, a smart card, a hardware security module comprised in a manufacturing device 12) that has signed the hearing device certificate 100. The signing device identifier 136B may for example comprise a medium access control, MAC, address of the signing device, a serial number. The signing device identifier 136B allows for example the hearing device 2 to determine whether the signing device is e.g. black-listed or not, and thus to reject hearing device certificates 100 signed by a signing device that is black-listed.

The hearing device certificate 100 optionally comprises one or more hardware identifiers including a first hardware identifier 148B and/or a second hardware identifier (not shown). The first hardware identifier 148B may identify a piece of hardware comprised in the hearing device 2, such as a processing unit 4, a radio chip comprised in the hearing device 2, a digital signal processor of the hearing device 2. The first hardware identifier 148B may also be stored in a register of the piece of hardware comprised in the hearing device 2 during manufacturing of the piece of hardware. The first hardware identifier 148B may comprise a serial number, a medium access control, MAC, address, a chip identifier, or any combination thereof. The hearing device certificate 100 may comprise a first hardware identifier 148B, a second hardware identifier and/or a third hardware identifier. For example, the first hardware identifier 148B may provide a first hearing device specific value present in a register of a hardware module (e.g. the processing unit or the radio chip) of the hearing device 2 while the second hardware identifier may provide a second hearing device specific value present in a register of a hardware module of the hearing device 2, and a third hardware identifier may provide a third hardware module identifier (e.g. a processing unit identifier, a DSP identifier). The hearing device 2, upon receiving the hearing device certificate 100 comprising the first hardware identifier 148B, may then verify the hearing device certificate 100 by comparing its stored hardware identifier and the first hardware identifier 148B comprised in the hearing device certificate 100 received. This way, the hearing device 2 may determine if the received hearing device certificate is intended for the hearing device 2 and reject the received hearing device certificate if the stored and received hardware identifiers do not match.

The hearing device certificate 100 optionally comprises a client device type authorization identifier 144. A client device type may comprise a model, category or type of client devices, such as a tablet product model, category or type, a USB dongle product model, category or type. The client device type authorization identifier 144 is an identifier of an authorized client device type, such as an identifier of the client device types that the hearing device 2 may authorize for communication, such as for fitting, maintenance and/or operation. The client device type authorization identifier 144 is for example a bit-field indicating the type of client device the hearing device 2 should allow for fitting.

The hearing device certificate 100 optionally comprises a token parameter 146. The token parameter 146 indicates whether a token-based authentication is to be enabled or not. For example, if the token parameter 146 is set to 0, token-based authentication of client devices is not to be enabled by the hearing device 2 and the hearing device 2 is to use for example a combination of client device type identifier and/or a client device identifier (such as a serial number) to perform an authentication of the client device 10. If for example the token parameter 146 is set to 1, token-based authentication of client devices is to be enabled by the hearing device 2, i.e. the hearing device 2 authenticates the client device 10 (such as a based on a token received from the client device 10). The hearing device 2 may also derive a session specific token based on the received token parameter 146 which is used to e.g. accept the connection to the client device 10 without user intervention.

The hearing device certificate 100 comprises one or more of a hardware platform identifier 138, a software platform identifier 140, and/or a certificate timestamp 142. The hardware platform identifier 138 may identify a hardware platform, such as an operational hearing device hardware platform, i.e. a hardware platform on which the hearing device certificate may be used. The software platform identifier 140 may identify a family of software platforms on which the hearing device certificate is configured to operate. The certificate timestamp 142 refers to a timestamp of production or manufacture of the hearing device certificate 100, such as a timestamp of the manufacturing device 12 indicating a time instant when the hearing device certificate 100 was generated. The certificate timestamp 142 may be in form of e.g.: hour, min, date, month, year.

The hearing device certificate comprises a digital signature 113B and/or a MAC. The digital signature 113B enables a proof or verification of authenticity of the hearing device certificate 100, such as verification of the signer legitimacy (e.g. whether the signer is a legitimate manufacturing device). The digital signature 113B is generated by the manufacturing device 12 using a device family private key during manufacturing of the hearing device. The hearing device 2 or the processing unit 4 may then verify the digital signature 113B, e.g. when receiving the hearing device certificate 100 comprising the digital signature 113B. The digital signature 113B is verifiable by the hearing device 2 using a corresponding device family public key. If the digital signature 113B is not successfully verified using the alleged public key, the hearing device may disregard the hearing device certificate 100 and/or abort normal operation.

Figure 4:
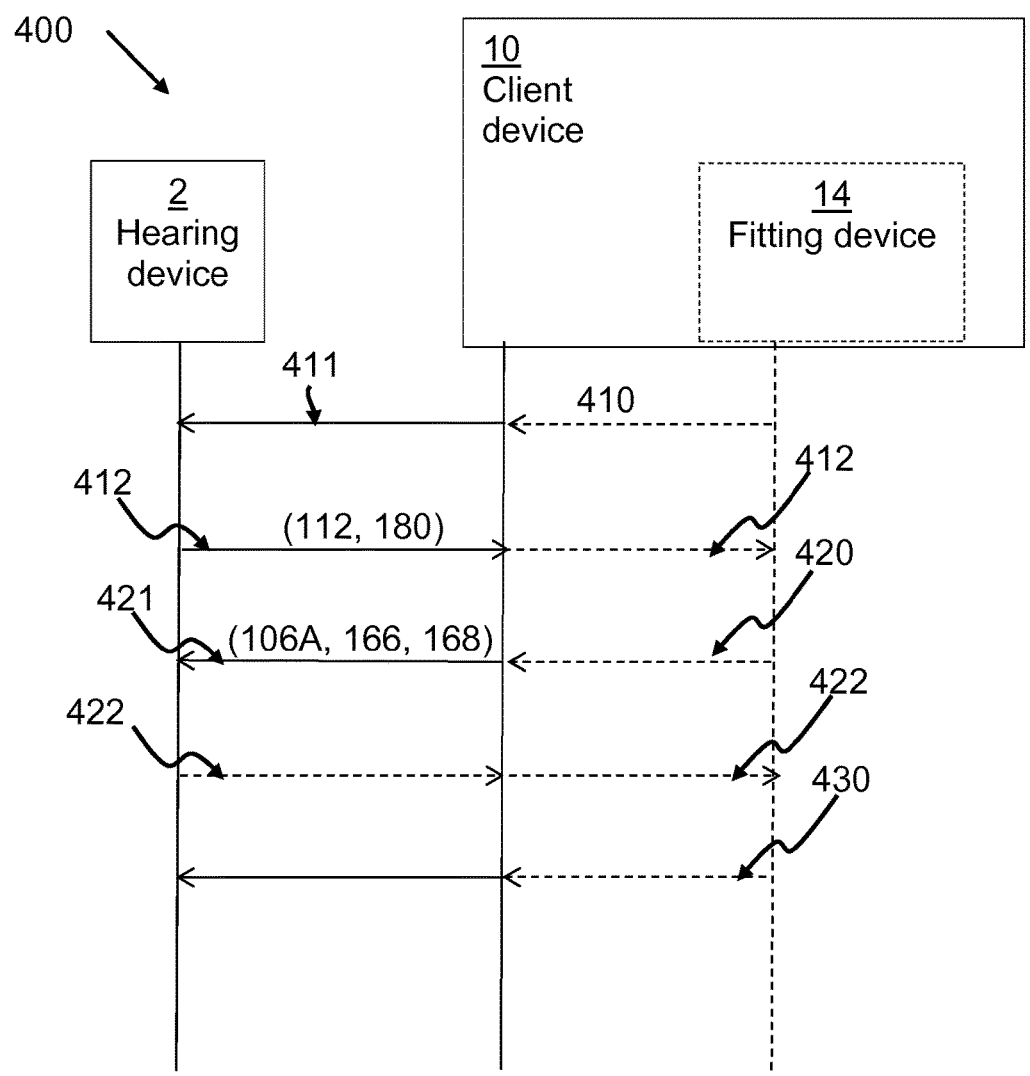

FIG. 4 schematically illustrates an exemplary signalling diagram 400 involving a hearing device 2 capable of logging, and a client device 10. The client device 10 may comprise a fitting device 14. The hearing device 2 receives a connection request or message 411 from the client device 10. When the client device 10 comprises a fitting device 14, the fitting device 14 may generate a connection request 410, which is transmitted by the client device 10 as connection request 411. The hearing device 2 generates a connection response 412 comprising a hearing device identifier 112 and/or a session identifier 180. When the client device 10 comprises a fitting device 14, the fitting device 14 may receive the connection response 412 via the client device 10. The client device 10 generates an authentication message 421 and transmits the authentication message 421 to the hearing device 2. The authentication message 421 comprises encrypted client device certificate 106A, authentication key identifier 166, and/or authentication type identifier 168. Any of client device type identifier 156, client device identifier 158, a user identifier may be comprised in the encrypted client device certificate 106A. Any of a client device identifier, a client device type identifier 156 and/or a user identifier may be comprised in the authentication message 421 in plain text, e.g. as part of client device certificate 106 (see FIG. 6). The hearing device 2 is configured to authenticate the authentication message 421 using a hearing device certificate stored in the memory unit 6. For example, the hearing device 2 is configured to authenticate the authentication message 421 by verifying the content, origin and/or integrity of the authentication message 421. The hearing device 2 determines the type of client device based on the client device type identifier. The hearing device 2 verifies whether the received value of authentication key identifier 166 received is higher or equal to a hearing device key identifier comprised in the hearing device certificate 100 (and/or the latest value the hearing device 2 has stored as hearing device key identifier in e.g. a flash memory). If The hearing device 2 determines that the received value of authentication key identifier 166 received is higher or equal to a hearing device key identifier, the authentication continues, else the session is terminated immediately (with proper error code). This prevents the hearing device to communicate with an expired/revoked client device.

The hearing device 2 uses the hearing device key corresponding to the authentication key identifier 166 received, and session identifier 180 (e.g. a 16 bytes of random number) sent in connection response 412 to the client device 10 to derive the certificate key, such as to compute a common secret from which the certificate key is derivable.

Using the certificate key, the hearing device 2 decrypts the encrypted client device certificate 106A. The hearing device 2 may then verify that the certificate type identifier 130A comprised in the decrypted client device certificate 106B corresponds to the right certificate 106B. The hearing device 2 may then verify that the authentication type identifier 168 received in plain text match the client device type identifier 156 in the decrypted certificate 106B. The hearing device 2 may then verify that the authentication key identifier 166 received in plain text match the client device key identifier 159 in the decrypted certificate 106B. The hearing device 2 may then verify that the version identifier 132 in the decrypted certificate 106B is supported by the hearing device 2. e. The hearing device 2 may then verify that the authentication type identifier 168 received in plain text or the client device type identifier 156 is listed in the client device type authorization identifier 144 of the stored hearing device certificate 100. The hearing device 2 may then verify that the authentication type identifier 168 received in plain text or the client device type identifier 156 associated with the first hardware identifier 148A, 150 is not black-listed. The signing device identifier 136A is verified not to be listed on the blacklist. The hearing device 2 may then verify the digital signature 113A of the client device certificate 106B using the matching public key.

Upon successful authentication of the authentication message 421 and/or verification, the hearing device 2 may send an authentication response 422 to the client device 10 that may forward it to the fitting device 14.

The communication channel is now open and secure. The client device 10 or fitting device 14 via the client device 10 may send hearing device data 430 to the hearing device 2. Hearing device data 430 comprises e.g. firmware, fitting data, and/or hearing device operating parameters. Fitting data may for example be data generated by a fitting device 14 used by a dispenser when a hearing device 2 is being fitted in a user's ear. Fitting data may comprise hearing loss parameters, compressor parameters, filter coefficients, and/or gain coefficients. Hearing device operation parameters may comprise volume control parameters, mode and/or program control parameters. Firmware may refer to a computer program provided by the hearing device manufacturer, and to be installed on the hearing device 2 to control the hearing device 2. Firmware is for example to be installed to upgrade the operations and capabilities of the hearing device 2.

Figure 5:
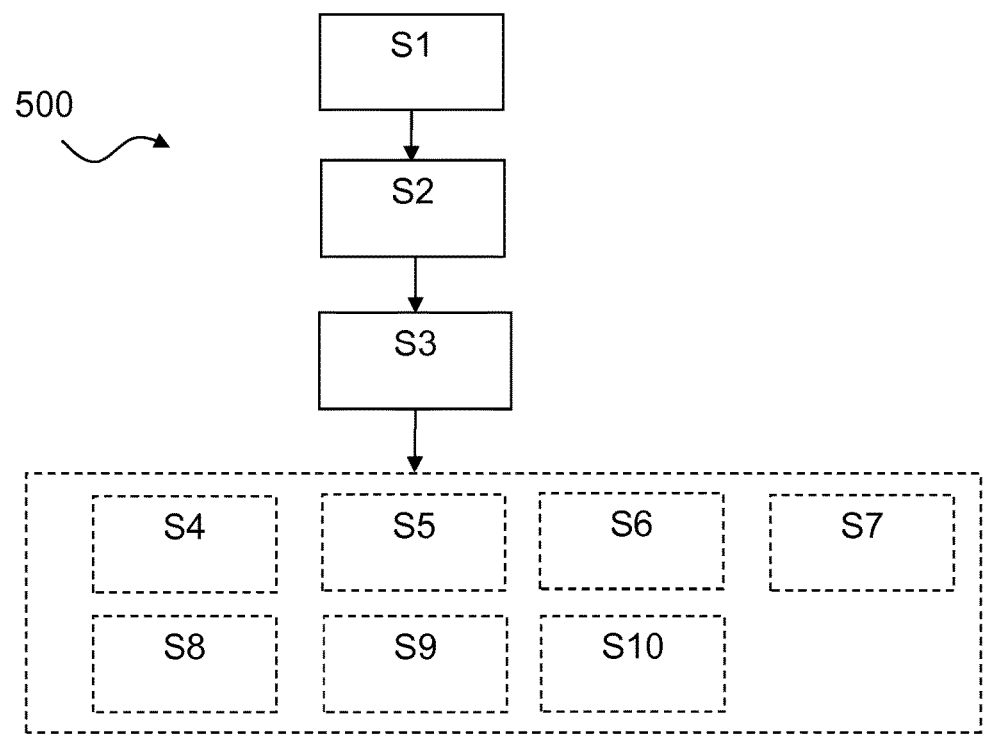

FIG. 5 schematically illustrates a flowchart of an exemplary method 500 of operating a hearing device 2. The hearing device 2 comprises a processing unit 4 configured to compensate for hearing loss of a user of the hearing device 2, a memory unit 6, and an interface 8. The method comprises receiving S1 an authentication message 421 from a client device 10 via the interface 8; and deriving S2 a client device identifier 158 from the authentication message 421. For example, the interface 8 may be configured to receive the authentication message 421 from the client device 10. The client device 10 sends the authentication message 421 to the hearing device 2 in order to open a session or a connection with the hearing device 2, for e.g. sending fitting data, hearing device operating parameters, and/or firmware data. Deriving S2 the client device identifier 158 from the authentication message 421 may comprise obtaining the client device identifier 158 from the authentication message 421, such as obtaining the client device identifier 158 from processing a payload of the authentication message 421. The method comprises storing S3 the client device identifier 158 in the memory unit 6. Storing S3 the client device identifier 158 in the memory unit 6 may contribute to the logging capability. This enables the hearing device to log or record one or more client device identifiers that have been in contact with the hearing device.

In one or more exemplary methods, the authentication message 421 comprises an encrypted client device certificate 106A. Deriving S2 a client device identifier 158 from the authentication message 421 may comprise obtaining a decrypted version 106B of the encrypted client device certificate 106A by decrypting the encrypted client device certificate 106A and deriving the client device identifier 158 from the decrypted version 106B of client device certificate 106. Decrypting the encrypted client device certificate 196A may comprise decrypting the encrypted client device certificate 106A using a certificate key. The certificate key may be based on a common secret and/or a certificate value. The method may comprise generating the common secret based on a hearing device key. For example, decrypting the encrypted client device certificate 106A may comprise retrieving the hearing device certificate 100 from the memory unit 6, the hearing device certificate 100 comprising a hearing device key, such as 115A. For example, decrypting the encrypted client device certificate 106A may comprise generating the certificate key based on the common secret. For example, generating the common secret may be based on a hearing device key and a session identifier. The method may comprise generating the common secret using the processing unit and storing S4 the common secret in the memory unit 6. The method may comprise generating S5 a session identifier upon reception of a connection request 411. The session identifier may comprise a random or pseudo random number of a defined length. The common secret CS may be generated e.g. as follows:

$$CS=\text{hash}(HD\_KEY, S\_ID),$$

where hash is a hash function, HD_KEY is the hearing device key and S_ID is the session identifier.

The method may comprise generating the certificated key based on the common secret. The certificate key may be generated by performing a hash function on the secret and/or a certificate value. The certificate key may be generated e.g. as follows:

$$C\_KEY=\text{hash}(CS, C\_VAL),$$

where hash is a hash function, CS is the common secret and C_VAL is a certificate value. The certificate value may be a predefined value or string, such as "certificate".

Decrypting the encrypted client device certificate 106A may be based on using the certificate key generated by the hearing device 2 and may result in obtaining the decrypted version 106B of the client device certificate 106. The hearing device 2 then derives the client device identifier 158 from the decrypted version 106B of the client device certificate 106 and stores the client device identifier 158. The method may comprise verifying the content of the decrypted version 106B of the client device certificate 106.

In one or more exemplary methods, the authentication message 421 comprises a client device type identifier 156, and the method comprises storing S6 the client device type identifier 156 in the memory unit 6.

In one or more exemplary methods, the authentication message 421 comprises a user identifier, and the method comprises storing S7 the user identifier in the memory unit 6.

In one or more exemplary methods, the method comprises generating S8 and transmitting S9 a connection response 412 comprising a session identifier upon receipt of a connection request 411. The method may comprise receiving a connection request 411 via the interface 8, such as via a wireless communication interface, an activation button, a detection of a user input, and/or a docking event etc. The method may comprise generating a session identifier, such as generating a random or pseudo-random number to be used as the session identifier. The method may comprise transmitting a connection response 412 via the interface 8 to e.g. the client device 10.

The method may comprise generating a common secret based on the session identifier and storing S4 the common secret in the memory unit 6, the common secret being linked to the client device identifier 158. Generating a common secret based on the session identifier may comprise generating the common secret based on the session identifier and a hash function, such as based on applying a hash function to the session identifier and a hearing device key. Generating a common secret comprise retrieving a hearing device key. The method may comprise linking the common secret to the client device identifier 158. For example, linking the common secret to the client device identifier 158 comprises associating the common secret to the client device identifier 158, such as associating the common secret to the client device identifier 158 in a list or table in the memory unit 6.

In one or more exemplary methods, the connection response 412 comprises a hearing device identifier 112 of the hearing device 2, and generating the common secret is based on the hearing device key, such as a first primary hearing device key 115A, such as first secondary hearing device key 115B. For example, generating the common secret comprises retrieving the hearing device key from the memory unit 6, such as from the hearing device certificate 100 stored in the memory unit.

The method may comprise storing the session identifier in the memory unit 6, and linking the session identifier to the client identifier 158 in the memory unit 6. Linking the session identifier to the client device identifier 158 may comprise associating the session identifier to the client device identifier 158, such as in a list or table in the memory unit 6.

In one or more exemplary methods, the method comprises linking the user identifier and/or the client device type identifier 156 to the session identifier and/or the common secret. For example, linking the user identifier and/or the client device type identifier 156 to the session identifier and/or the common secret comprises associating the user identifier and/or the client device type identifier 156 to the session identifier and/or the common secret, such as in one or more lists and/or tables in the memory unit 6.

In one or more exemplary methods, the method comprises linking the client device identifier 158, the user identifier and/or the client device type identifier 156 to the session identifier and/or the common secret. For example, linking the client device identifier 158, the user identifier and/or the client device type identifier 156 to the session identifier and/or the common secret comprises associating the client device identifier 158, the user identifier and/or the client device type identifier 156 to the session identifier and/or the common secret, such as in one or more list and/or tables in the memory unit.

The method may comprise authenticating S10 the authentication message 421 using a hearing device certificate 100 stored in the memory unit 6. In one or more exemplary methods, the authentication message 421 comprises an authentication type identifier, and/or an authentication key identifier. An authentication type identifier is indicative a client device type identifier 156 of the client device 10, which is the sender of the authentication message 421. An authentication key identifier is indicative of a hearing device key identifier, such a first hearing device key identifier 114, a second hearing device key identifier 116. In one or more exemplary methods, the authentication message 421 comprises an authentication type identifier, and/or an authentication key identifier in plain text. The memory unit 6 has a hearing device certificate 100 stored thereon. Authenticating S10 the authentication message 421 using the hearing device certificate 100 may comprise verifying the authentication type identifier and/or the authentication key identifier. For example, verifying the authentication type identifier and/or the authentication key identifier comprises verifying that the authentication key identifier matches a corresponding hearing device key identifier, such as the first hearing device key identifier 114 comprised in the hearing device certificate 100. For example verifying the authentication type identifier and/or the authentication key identifier comprises verifying that the authentication key identifiers has a value that is equal or higher than a value of the corresponding hearing device key identifier, such as the first hearing device key identifier 114 comprised in the hearing device certificate 100. For example, verifying the authentication type identifier and/or the authentication key identifier comprises verifying that the authentication key identifier matches a corresponding client device key identifier 158 comprised in the decrypted version 106B of the client device certificate. For example, verifying the authentication type identifier and/or the authentication key identifier comprises verifying that the authentication type identifier matches a corresponding client device type identifier 158 comprised in the decrypted version 106B of the client device certificate.

Figure 6:
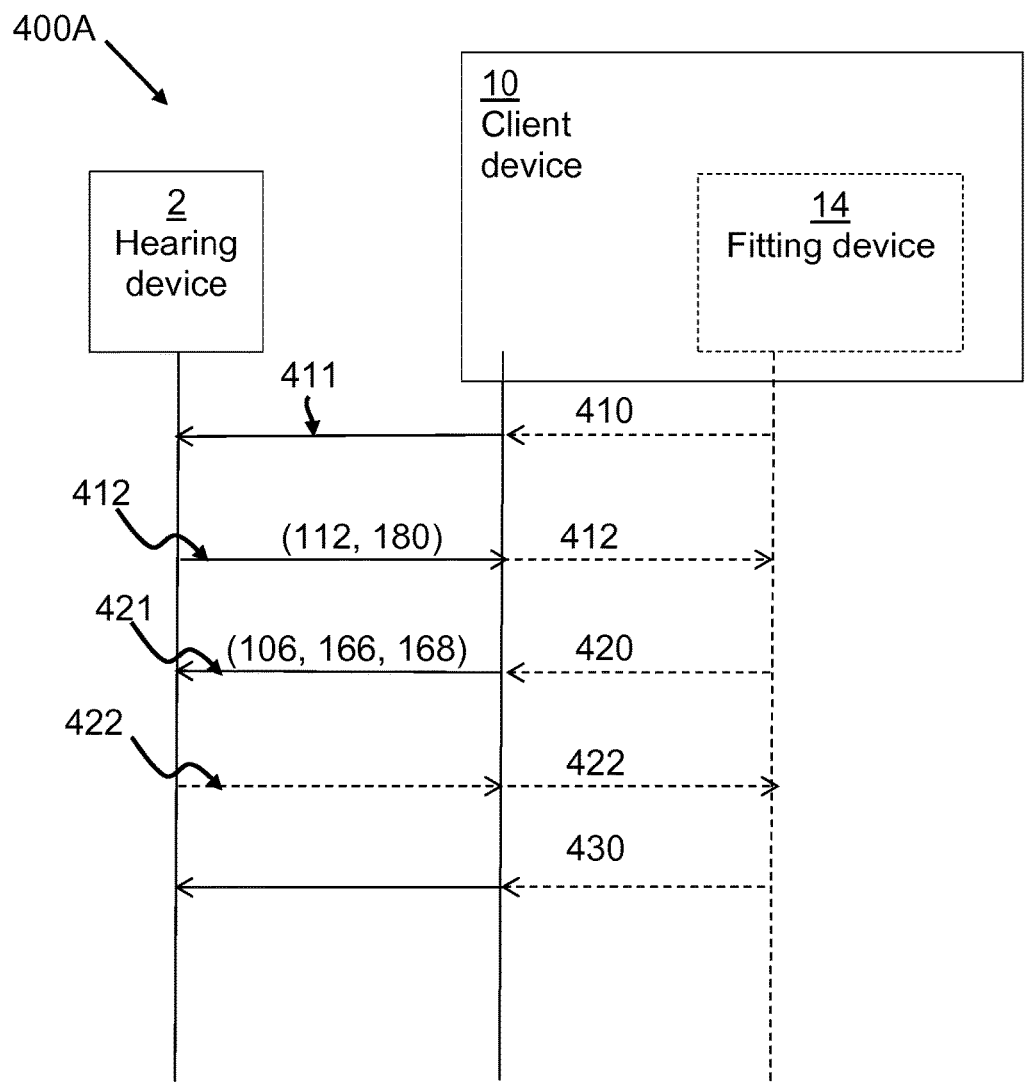

FIG. 6 illustrates an exemplary signalling diagram 400A, wherein the authentication message 421 comprises the client device certificate 106 in plain text.

Exemplary hearing devices and methods are set out in the following items.

Item 1. A hearing device comprising
a processing unit configured to compensate for hearing loss of a user of the hearing device;
a memory unit; and
an interface,
wherein the hearing device is configured to:
receive an authentication message from a client device via the interface;
derive a client device identifier from the authentication message; and
store the client device identifier in the memory unit.

Item 2. Hearing device according to item 1, wherein the authentication message comprises an encrypted client device certificate, and wherein to derive the client device identifier from the authentication message comprises to obtain a decrypted version of the encrypted client device certificate by decrypting the encrypted client device certificate and to derive the client device identifier from the decrypted version of the encrypted client device certificate.

Item 3. Hearing device according to any of items 1-2, wherein the authentication message comprises a client device type identifier, and wherein the processing unit is configured to store the client device type identifier in the memory unit.

Item 4. Hearing device according to any of items 1-3, wherein the authentication message comprises a user identifier, and wherein the processing unit is configured to store the user identifier in the memory unit.

Item 5. Hearing device according to any of items 1-4, wherein the hearing device is configured to generate by the processing unit a connection response comprising a session identifier in response to reception of a connection request and to transmit via the interface the connection response.

Item 6. Hearing device according to item 5, wherein the hearing device is configured to generate by the processing unit, a common secret based on the session identifier; to store the common secret in the memory unit, and to link the common secret to the client device identifier.

Item 7. Hearing device according to item 6, wherein to link the common secret to the client device identifier comprises to associate in a table the common secret to the client device identifier.

Item 8. Hearing device according to any of items 6-7, wherein the hearing device is configured to generate the common secret based on a hearing device key.

Item 9. Hearing device according to any of items 5-8, wherein the hearing device is configured to store the session identifier in the memory unit, wherein the session identifier is linked to the client identifier in the memory unit.

Item 10. Hearing device according to any of items 1-9, wherein the hearing device is configured to authenticate the authentication message using a hearing device certificate stored in the memory unit.

Item 11. A method of operating a hearing device comprising a processing unit configured to compensate for hearing loss of a user of the hearing device, a memory unit, and an interface, the method comprising:
receiving an authentication message from a client device via the interface;
deriving a client device identifier from the authentication message; and
storing the client device identifier in the memory unit.

Item 12. Method according to item 11, wherein the authentication message comprises an encrypted client device certificate, and wherein deriving a client device identifier from the authentication message comprises obtaining a decrypted version of the encrypted client device certificate by decrypting the encrypted client device certificate and deriving the client device identifier from the decrypted version of client device certificate.

Item 13. Method according to any of items 11-12, wherein the authentication message comprises a client device type identifier, and wherein the method comprises storing the client device type identifier in the memory unit.

Item 14. Method according to any of items 11-13, wherein the authentication message comprises a user identifier, and wherein the method comprises storing the user identifier in the memory unit.

Item 15. Method according to any of items 11-14, the method comprising generating a session identifier and transmitting a connection response comprising the session identifier upon receipt of a connection request.

Item 16. Method according to item 15, the method comprising generating a common secret based on the session identifier, storing the common secret in the memory unit, and linking the common secret to the client device identifier.

Item 17. Method according to any of items 15-16, wherein the connection response comprises a hearing device identifier of the hearing device, and wherein generating the common secret is based on the hearing device identifier.

Item 18. Method according to any of items 15-17, wherein the method comprises storing the session identifier in the memory unit, and linking the session identifier to the client identifier in the memory unit.

Item 19. Method according to any of items 11-18, wherein the method comprises authenticating the authentication message using a hearing device certificate stored in the memory unit.

The use of the terms "first", "second", and the like does not imply any particular order, but they are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 2 hearing device
4 processing unit
5 microphone
6 memory unit
7 receiver
8 interface
10 client device
12 manufacturing device
14 fitting device
16 server device
21 communication link between client device and hearing device
22 communication link between server device and manufacturing device
23 communication link between hearing device and manufacturing device
24 communication link between server device and client device/fitting device
100 hearing device certificate
100A encrypted hearing device certificate
100B decrypted version of encrypted hearing device certificate
106 client device certificate
106A encrypted client device certificate
106B decrypted version of encrypted client device certificate
112 hearing device identifier
113A digital signature comprised in the client device certificate
113B digital signature comprised in the hearing device certificate
114 first hearing device key identifier
115 first set of hearing device keys
115A first primary hearing device key
115B first secondary hearing device key
115C first tertiary hearing device key
115D first quaternary hearing device key
116 second hearing device key identifier
117 second set of hearing device keys
117A second primary hearing device key
117B second secondary hearing device key
117C second tertiary hearing device key
117D second quaternary hearing device key
130A certificate type identifier comprised in the client device certificate
130B certificate type identifier comprised in the hearing device certificate
132 version identifier
134 length identifier
136A signing device identifier comprised in the client device certificate
136B signing device identifier comprised in the hearing device certificate
138 hardware platform identifier
140 software platform identifier
142 certificate timestamp
144 client device type authorization identifier
146 token parameter 148A first hardware identifier comprised in the client device certificate
148B first hardware identifier comprised in the hearing device certificate
150 second hardware identifier comprised in the client device certificate
156 client device type identifier
158 client device identifier;
159 client device key identifier
160 BLUETOOTH address
166 authentication key identifier
168 authentication type identifier
180 session identifier
400, 400A signalling diagram
410 connection request from the fitting device
411 connection request from the client device
412 connection response
421 authentication message
422 authentication response
430 hearing device data
500 method

The invention claimed is:

1. A hearing device comprising:
a processing unit configured to compensate for hearing loss of a user of the hearing device;
a memory unit; and
an interface;
wherein the hearing device is configured to:
  receive an authentication message from a client device via the interface,
  obtain a client device identifier by processing the authentication message, and
  store the client device identifier in the memory unit after the client device identifier is obtained;
wherein the authentication message comprises an encrypted certificate; and
wherein the hearing device is configured to obtain the client device identifier by:
  decrypting the encrypted certificate to obtain a decrypted version of the encrypted certificate, and
  obtaining the client device identifier based on the decrypted version of the encrypted certificate.

2. The hearing device according to claim 1, wherein the authentication message comprises a client device type identifier, and wherein the memory unit is configured to store the client device type identifier.

3. The hearing device according to claim 1, wherein the authentication message comprises a user identifier, and wherein the memory unit is configured to store the user identifier.

4. The hearing device according to claim 1, wherein the processing unit is configured to generate a connection response comprising a session identifier in response to reception of a connection request, and wherein the interface is configured to transmit the connection response.

5. The hearing device according to claim 1, further comprising a hearing device key.

6. The hearing device according to claim 4, wherein the hearing device is configured to store the session identifier in the memory unit, wherein the session identifier is linked to the client device identifier in the memory unit.

7. The hearing device according to claim 1, wherein the hearing device is configured to authenticate the authentication message using a hearing device certificate stored in the memory unit.

8. The hearing device of claim 1, wherein the client device identifier comprises an identifier that identifies the client device, the client device being different from the hearing device.

9. The hearing device of claim 1, wherein the processing unit is configured to compensate for the hearing loss based on fitting data.

10. The hearing device of claim 5, wherein the hearing device key comprises a keying material configured to allow derivation of a symmetric session key.

11. A method of operating a hearing device comprising a processing unit configured to compensate for hearing loss of a user of the hearing device, a memory unit, and an interface, the method comprising:
receiving an authentication message from a client device via the interface;
obtaining a client device identifier by processing the authentication message;
storing the client device identifier in the memory unit of the hearing device after the client device identifier is obtained;
wherein the authentication message comprises an encrypted certificate; and
wherein the act of obtaining the client device identifier by processing the authentication message comprises:
  decrypting the encrypted certificate to obtain a decrypted version of the encrypted certificate, and
  obtaining the client device identifier based on the decrypted version of the encrypted certificate.

12. The method of claim 11, wherein the client device identifier comprises an identifier that identifies the client device, the client device being different from the hearing device.

* * * * *